US008670752B2

(12) United States Patent
Fan et al.

(10) Patent No.: US 8,670,752 B2
(45) Date of Patent: Mar. 11, 2014

(54) PROVIDING INTEGRATED SERVICE-ENTITY PREMIUM COMMUNICATION SERVICES

(75) Inventors: James Fan, San Ramon, CA (US); David Chen, Fremont, CA (US); Richard Kuo, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 289 days.

(21) Appl. No.: 12/890,088

(22) Filed: Sep. 24, 2010

(65) Prior Publication Data

US 2012/0077468 A1  Mar. 29, 2012

(51) Int. Cl.
*H04M 3/42* (2006.01)

(52) U.S. Cl.
USPC ............ 455/414.2; 455/432.1; 455/3.01; 725/62; 380/247

(58) Field of Classification Search
USPC ............ 455/414.1–414.3, 432.1–433, 455/435.1–435.3, 418–420, 3.03–3.06; 348/552, 14.05; 370/259, 343, 389, 370/400–409, 411; 725/25, 62, 51, 27, 100, 725/132, 140, 114, 116, 30, 31, 313; 380/247–250

See application file for complete search history.

(56) References Cited

U.S. PATENT DOCUMENTS

| 6,349,205 | B1* | 2/2002 | Fang et al. ............... 455/419 |
| 6,728,531 | B1* | 4/2004 | Lee et al. ................. 455/419 |
| 6,963,579 | B2 | 11/2005 | Suri |
| 7,010,002 | B2 | 3/2006 | Chow et al. |
| 2003/0108176 | A1 | 6/2003 | Kung et al. |
| 2003/0161335 | A1* | 8/2003 | Fransdonk ............... 370/401 |
| 2005/0239445 | A1 | 10/2005 | Karaoguz et al. |
| 2007/0253406 | A1 | 11/2007 | Menasco, Jr. et al. |
| 2007/0300252 | A1* | 12/2007 | Acharya et al. ............ 725/25 |
| 2008/0196056 | A1* | 8/2008 | Bassett et al. ............. 725/25 |
| 2010/0115540 | A1 | 5/2010 | Fan et al. |
| 2010/0148923 | A1 | 6/2010 | Takizawa et al. |
| 2010/0159898 | A1* | 6/2010 | Krzyzanowski et al. .. 455/414.1 |
| 2011/0231872 | A1* | 9/2011 | Gharachorloo et al. ........ 725/28 |
| 2011/0320525 | A1* | 12/2011 | Agarwal et al. ............. 709/203 |

OTHER PUBLICATIONS

Humphries, Matthew, dated Sep. 25, 2008, "Japanese Put Intelligent Key Into Mobile Phones," <http://www.geek.com/articles/mobile/japanese-put-intelligent-key-into-mobile-phones-20080925/>. Accessed Jan. 5, 2011.

* cited by examiner

*Primary Examiner* — Ronald Eisner
(74) *Attorney, Agent, or Firm* — Turocy & Watson, LLP

(57) ABSTRACT

Systems, methods, and devices that integrate a subscriber's communication services, including home wireline communication services, and a service-entity communication services are presented. User equipment (UE) is associated with a subscription for communication services, comprising wireline and wireless communication services, of a subscriber. The UE communicates with an enhanced service management component (ESMC) associated with a service entity to facilitate integration of at least a portion of the subscriber's communication services with the service entity's communication services while the UE is registered with the ESMC. While registered, the subscriber's UE is used to facilitate controlling a door lock to the subscriber's room associated with the service entity; and accessing the integrated communication services, including at least a portion of the home services, while in a location of the service entity, at least when the home services are provided via the same provider as that serving the service entity.

20 Claims, 21 Drawing Sheets

US 8,670,752 B2

PROVIDING INTEGRATED SERVICE-ENTITY PREMIUM COMMUNICATION SERVICES

TECHNICAL FIELD

The subject specification generally relates to providing communication services, and, more particularly, to systems, methods, and devices for providing integrated service-entity premium communication services.

BACKGROUND

Mobile communication devices (e.g., wireless mobile phone or smart phone, electronic note pad, electronic netbook, etc.) have become prevalent in everyday life. While a primary application of such devices can be phone calls, the use of such devices for other applications, including messaging (e.g., text messages, multimedia messages, instant messages, etc.), location mapping, social networking, event documenting (e.g., taking photographs or video, recording audio, etc.), word processing, etc., is ever increasing. The leveraging of mobile communication devices for other applications continues to extend to a variety of areas of subscriber's lives.

Currently, subscribers can buy bundled services from a service provider, wherein the bundled services can comprise fixed or wireline services (e.g., home services, such as television (TV) programming; music programming; home or landline phone with voice mail and/or other phone features; broadband, Digital Subscriber Line (DSL), or other type of communication network connectivity; etc.) and wireless services (e.g., wireless voice call services, messaging services, cellular or WI-FI communication network connectivity, etc.) that can be utilized via a mobile communication device. However, conventionally, only the wireless services are considered portable. When the subscriber is on a vacation or business trip and stays in a hotel, the subscriber will be provided with hotel specific communication services which can include a different room phone number, different set of TV channels, a TV channel to view bill or check out information, credit card type room keys, etc. All of the communication services offered by the hotel are not integrated. Accordingly, today, there is no way to desirably provide integrated hotel premium communication services that include integration of hotel specific communication services and the subscriber's bundled services.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

Systems, methods, and devices that can integrate at least a desired portion of a subscriber's communication services (e.g., home wireline communication services, wireless communication services) with service-entity communication services (e.g., hotel communication services) are presented. In an aspect, a subscriber's user equipment (UE) can be associated with a subscription for communication services, comprising wireline (e.g., Internet Protocol Television (IPTV), music services, home phone and messaging services, etc.) and wireless communication services (e.g., mobile phone services, mobile messaging services, application-based services, etc.), of the subscriber, wherein the wireline and/or wireless communication services typically can be provided to the subscriber at a desired location (e.g., subscriber's home or work office) and the wireless communication services can be provided to the UE in locations where wireless communication is supported.

When the subscriber checks in or registers with a service entity (e.g., hotel and/or casino, convention center, entertainment venue, etc.), information associated with the subscriber's UE (e.g., UE identifier, portability key associated with the subscriber's communication services, etc.) and the subscriber can be provided to an enhanced service management component (ESMC) associated with the entity management system of the service provider to facilitate integrating the UE with the entity management system and integrating a desired portion of the subscriber's own communication services with the service entity's communication services. In accordance with various embodiments, the ESMC can provide a unique security code to the UE or a radio-frequency identification (RFID) tag, comprising the security code, can be associated with (e.g. attached to) the UE. In an aspect, the entity management system can comprise a desired number of access points (APs) (e.g., femto APs, pico APs, WI-FI APs, WI-FI-direct APs, etc.) that can be distributed throughout the premises of the service entity to facilitate providing desired wireless communication services to the UEs and other communication devices located in the coverage area of the APs, wherein, upon checking in or registering, the UE identifier can be added to a list (e.g., whitelist) of allowed communication devices, which is provided to the APs, to facilitate communication by the UE via the APs while the UE is operating on the premises of the service entity.

In accordance with various aspects, if the subscriber is part of a group of people (e.g., one member of a family, school group, work group, etc.), all or a desired portion of the UEs of subscribers in the group can be registered and integrated at the same time as the initial subscriber or at a future time, as desired. A same or different security code can be used for each UE in the group, as desired. Further, if any of the subscribers and associated UEs in the group are not present when the initial subscriber in the group is registered and the UE identifier(s) of the non-present UE(s) has already been provided to the ESMC, the ESMC can send the security code(s) to the non-present UEs, wherein for example, the non-present subscribers can use the non-present UEs and the information in the message to register with the ESMC and be integrated with the entity management system. As desired, for security reasons, the message comprising the security code can be time sensitive, wherein the message can be erased or become non-accessible and/or the information in the message can be rendered no longer valid by the ESMC, after a predefined amount of time has elapsed without the non-present UE(s) being registered. A subscriber of a non-registered UE can register by going through the normal registration process (e.g., register online, register at reception or registration desk of the service entity, etc.).

In an aspect, when registered or otherwise associated with the service entity, the subscriber's UE can be used to facilitate controlling a door lock to the subscriber's room provided by the service entity to the subscriber. In another aspect, the UE can download an application (e.g., UE integration application) that can be employed to facilitate configuring the UE to be integrated with the entity management component. The UE can be configured to have a designated unlock button(s) that can be used to generate and transmit an unlock door request to the ESMC to facilitate unlocking the door lock for the subscriber's room. In accordance with various embodiments, the unlock door request can comprise the UE identifier and/or the security code, which can be authenticated by the ESMC or door lock to facilitate validating the unlock door request. If the unlock door request is validated by the ESMC or the door lock (e.g., when the UE communicates the unlock door request directly to the door lock and the door lock has the capability to authenticate the request), the door lock can be unlocked, and if the request is not validated, the request can be denied.

In still another aspect, using the UE or communication devices (e.g., television (TV) and associated remote control unit) in the subscriber's room provided by the service entity, as desired, at least a portion of the subscriber's communication services, including at least a portion of the subscriber's wireline communication services, can be integrated with the service entity's communication services such that the integrated communication services can be provided to the UE or other communication device (e.g., subscriber's room TV), for example, while the subscriber is registered or otherwise associated with the service entity. For example, when the subscriber's communication services and the service entity's communication services are provided by the same service provider, a desired portion of the subscriber's own communication services (e.g., up to a predefined number of TV or music channels or other video programming) can be integrated with the service entity's communication channels for presentation on a communication device (e.g., subscriber's room TV) provided by the service entity (e.g., in the subscriber's room at the service entity's premises). For instance, the service entity's portal can be accessed, using the UE or the room's TV and remote control unit, and an API(s) can be invoked to connect with the service provider to facilitate selection of desired available communication services of the subscriber to be ported in or integrated with the service entity's communication services. If desired, additional communication services of the subscriber can be integrated, for example, at a predefined cost per additional communication service. In an aspect, employing the UE integration application, the UE can be configured to have a hot/soft button (e.g., hot/soft key) that, when manipulated (e.g., pressed), can allow the subscriber to use the UE to access the service entity's portal communication services or other available communication services in a same or similar as when the subscriber uses the room's remote control unit and TV to access the service entity's communication services. In an aspect, the voice, messaging, and IP-based network (e.g., Internet) services of the service entity also can be integrated with the subscriber's Unified Communication (UC) portal so that desired voice calls, voice mail, messages, alerts, etc., can be viewed from the same UC portal, which can be accessed, for example, by the subscriber's UE, when desired.

In still another aspect, when a first service provider that provides the subscriber's communication services is different than a second service provider that provides the service entity's communication services, a broker service (e.g., video broker service) can be employed to facilitate provision and integration of at least some of the subscriber's communication services, wherein, for example, a charge plan can be agreed upon by the subscriber for the provision of the subscriber's communication services.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
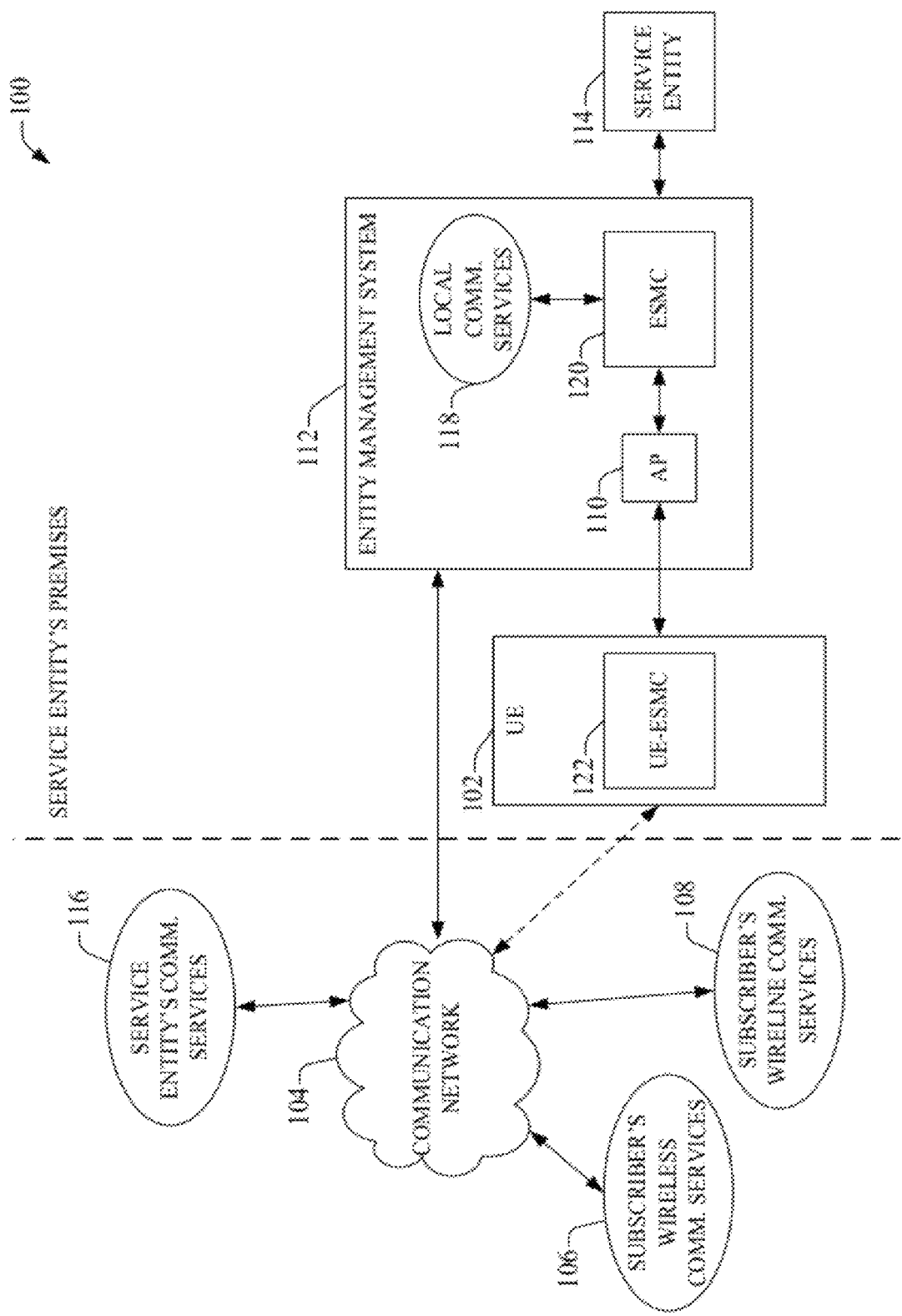
FIG. 1 is a block diagram of an example system that can integrate a subscriber's communication services with a service-entity's communication services while the subscriber is associated with the service entity's environment in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "interface," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream, or, in an embodiment, a wired (e.g., landline) communication device that has mobile messaging functionality and is utilized by a subscriber to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.
  2G Second Generation
  3G Third Generation
  3GPP Third Generation Partnership Project
  4G Fourth Generation
  AGPS Assisted GPS
  AP Access Point
  ADSL Asymmetric Digital Subscriber Line
  AWS Advanced Wireless Services
  BRAS Broadband Remote Access Server
  BTA Basic Trading Area
  CDMA Code Division Multiple Access
  CN Core Network
  CS Circuit-Switched
  CSCF Call Session Control Function
  CPE Customer Premise Equipment
  CPN Customer Premise Network
  DHCP Dynamic Host Configuration Protocol
  DSL Digital Subscriber Line
  DSLAM Digital Subscriber Line Access Multiplexer
  E911 Enhanced 911
  FCC Federal Communications Commission
  FL Forward Link
  GGSN Gateway GPRS Service Node
  GPRS General Packet Radio Service
  GPS Global Positioning System
  GW Gateway
  HAP Home Access Point HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL Currently, subscribers can buy bundled services from a service provider, wherein the bundled services can comprise wireline communication services (e.g., home services, such as television (TV) programming; music programming; home or landline phone with voice mail and/or other phone features; broadband, Digital Subscriber Line (DSL), or other type of communication network connectivity; etc.) and wireless communication services (e.g., wireless voice call services, messaging services, cellular or WI-FI communication network connectivity, etc.) that can be utilized via a mobile communication device (e.g., cellular phone, smart phone, etc.). However, conventionally, only the wireless communication services are portable. When the subscriber is on a vacation or business trip and stays in a hotel, the subscriber will be provided with hotel specific communication services which can include a different room phone number, different set of TV channels, a TV channel to view bill or check out information, credit card type room keys, etc. The communication services offered by the hotel are not integrated. Accordingly, today, there is no way to desirably provide integrated service-entity (e.g., hotel) premium communication services that include integration of service-entity specific communication services and the subscriber's bundled communication services.

To that end, systems, methods, and devices that integrate a subscriber's communication services, including home communication services, and a service-entity communication services are presented. User equipment (UE) can associated with a subscription for communication services, comprising wireline and wireless communication services, of a subscriber. The UE can communicate with an enhanced service management component (ESMC) associated with a service entity (e.g., hotel and/or casino, convention center, entertainment venue, etc.) to facilitate integration of at least a portion of the subscriber's communication services with the service entity's communication services while the UE is registered or checked in with the service entity, via the ESMC, or is otherwise associated with the service entity. While registered, the subscriber's UE can be integrated with the entity management system and can be used to facilitate controlling a door lock to the subscriber's room associated with the service entity; and accessing the integrated communication services, including at least a portion of the subscriber's home communication services, while in a location of the service entity.

Referring to the drawings, FIG. 1 is a block diagram of an example system 100 that can integrate a subscriber's communication services with a service-entity's communication services while the subscriber is associated with the service entity's environment in accordance with various aspects and embodiments of the disclosed subject matter. Aspects and embodiments of the subject specification can be employed in wireless, wired and converged (e.g., wireless and wired) communication networks.

In an aspect, the system 100 can include a desired number of UEs (e.g., mobile and/or wireless communication device, such as a mobile phone (e.g., 3GPP UMTS phone), personal digital assistant (PDA), computer, gaming console, etc.), comprising UE 102, in the communication network environment, wherein UE 102 can be connected via a wireless communication connection or wireline communication connection to a communication network 104, for example. In an embodiment, for example, as desired, the UE 102 also (e.g., alternatively) can be connected via a wireline communication connection (shown as a dotted line in FIG. 1) with the communication network 104.

The subscriber who owns or operates the UE 102 can have a subscription for services from a desired service provider(s), wherein the services can include wireless communication services 106 and wireline communication services 108, which can be integrated for use by the subscriber using the UE 102 and other communication devices of the subscriber in the subscriber's environment (e.g., home, work office, or other desired location). Typically, the subscriber can use the wireline communication services 108 at the subscriber's environment and the wireless communication services 106 while at or away from the subscriber's environment. In accordance with aspects of the disclosed subject matter, as more fully disclosed herein, the subscriber also can access and use at least a portion of the subscriber's wireline communication services 108 in other environments, such as a service-entity's environment, wherein the service entity can include, for example, a hotel and/or casino, a convention center, an entertainment or live venue, an office building, etc.

In an aspect, as the UE 102 moves through a wireless communication network environment, at various times, the UE 102 can be connected (e.g., wirelessly connected) to one of a plurality APs (e.g., macro AP, femto AP, pico AP, etc.), such as an AP 110 (e.g., femto AP, pico AP, etc.), that can operate in the wireless communication network environment. An AP (e.g., 110) can serve a specified coverage area to facilitate communication by the UE 102 in the wireless communication network environment. The AP 110 can serve a respective coverage cell (e.g., macrocell, femtocell, picocell, etc.) that can cover a respective specified area, and the AP 110 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 110 and incoming voice and data traffic can be paged and routed to the UE 102 through the AP 110, and outgoing voice and data traffic from the UE 102 can be paged and routed through the AP 110 to other communication devices (e.g., another UE) in the communication network environment. In an aspect, UE 102 can be connected and can communicate wirelessly using virtually any desired wireless technology, including, for example, cellular, WI-FI, WI-MAX, wireless local area networks (WLAN), etc.

In another aspect, the communication network 104 (e.g., 2G, 3G, 4G, or xG network, where x can be virtually any desired integer or real value) can facilitate wireless connection with the UEs 102 connected to an AP (e.g., AP 110; macro AP, not shown in FIG. 1) and facilitate communication by the UE 102 and/or other UEs associated with the communication network 104 with other communication devices (e.g., wireless communication devices, wireline communication devices) in the communication network environment. The communication network 104 (e.g., a core network, or network comprising a core network, and/or IP-based network) can facilitate routing voice and data communications between a communication device(s) (e.g., UE 102) and other communication devices (e.g., UE, landline phone, computer, email server, STB, multimedia server, audio server, video server, news server, financial or stock information server, other communication devices, etc.) associated with the communication network 104 in the communication network environment. The communication network 104 also can allocate resources to the UEs in the communication network 104, convert or enforce protocols, establish and enforce Quality of Service (QoS) for the UEs, provide applications or services in the communication network 104, translate signals, and/or perform other desired functions to facilitate system interoperability and communication in the communication network 104 (e.g., wireless portion of the communication network 104 or wireline portion of the communication network 104). The communication network 104 further can include desired components, such as routers, nodes, switches, interfaces, controllers, etc., that can facilitate communication of data between communication devices in the communication network environment.

In another aspect, system 100 can include an entity management component 112 that can cover and perform operations, including provision of communication services, controlling access to respective areas (e.g., dedicated areas, such as hotel rooms), security of the service entity's premises, etc., relating to or on behalf of the service entity 114 (e.g., hotel operator, venue operator, etc.). The entity management system 112 can include a sufficient number of APs, including AP 110, so as to be able to cover all or at least a desired portion of the environment (e.g., premises) of the service entity 114 to facilitate desired communication by and provision of desired services to communication devices (e.g., UE 102) and associated subscribers that are located on the service entity environment. The entity management system 112 can be associated with (e.g., connected to) the communication network 104 to facilitate communication between communication devices (e.g., UE 102) connected to the AP 110 (or other APs in the entity management system 112) or connected via a wireline connection in the entity management system 112 with other communication devices associated with the communication network 104.

The entity management system 112 can provide desired communication services 116 (e.g., television (TV) services, music services, voice or phone services, messaging services, gaming services, IP-based services, etc.), via the communication network 104, for which the service entity 114 has a subscription, wherein, as desired, the communications services 116 can be provided to persons (e.g., subscriber using UE 102) associated with the service entity's environment (e.g., connected to the entity management system 112 using the UE 102 when in the service entity's environment). In another aspect, the entity management system 112 also can comprise local communication services 118 (local comm. services) (e.g., service-entity portal services, voice services, video services, UE lock access/control, value added services, etc.) that can be provided to subscribers (e.g., subscriber using UE 102) associated with the service entity's environment.

At desired times, the subscriber, with the UE 102, can enter into the environment of a desired service entity (e.g., to check in and stay at a hotel), wherein when the subscriber can register or check-in with the service entity 114 (e.g., register or check-in as a guest of the hotel). When registered or checked-in, the service entity 114 can provide an integrated communication service experience by bridging the subscriber's services (e.g., home communication services, which can include wireless communication services 106 and wireline communication services 108) with the service entity's services, comprising communication services 116 and local communication services 118. The UE 102 can connect to the AP 110 (e.g., when registered at the hotel and added to a list (e.g., whitelist) of allowed users permitted to access and use the AP 106 and the service entity's communication platform) to facilitate communication by the UE 102 with other communication devices, and integration of and access to the subscriber's services (e.g., wireless communication services 106, wireline communication services 108) and service entity's services (e.g., communication services 116 and local communication services 118).

It is to be appreciated and understood that, while not expressly shown in FIG. 1, a portion of the communication network 104 may be privately owned by the service entity 114 (e.g., the service entity 114 may own at least some private branch exchanges (PBXs) to offer local phone services to subscribers), and at least a portion of the local communication services 118 can be provided via a local communication network associated with the service entity 114 (e.g., owned or operated by the service entity 114).

In accordance with various aspects, the entity management system 112 can include an enhanced services management component (ESMC) 120 that can facilitate integration of the subscriber's services (e.g., wireless communication services 106, wireline communication services 108) and the service entity's services (e.g., communication services 116 and local communication services 118), provision of communication services, controlling access to respective areas (e.g., dedicated areas, such as hotel rooms), security of the service entity's premises, etc., relating to or on behalf of the service entity 114. The AP 110 and other APs that are part of the entity management system 112 can be associated with (e.g., connected to) the ESMC 120.

In accordance with an aspect, the UE 102 can be integrated with the services of the service entity 114 to configure the UE 102 to be usable as a room key to control locking and unlocking of the lock on the room's door. For instance, when registering with the service entity 114, the subscriber's UE identifier (e.g., cell phone number) can be recorded by the entity management system 112 (e.g., the subscriber's UE identifier can be entered and stored in the ESMC 120 via a computer associated with the entity management system 112). If the subscriber has other family members or business partners sharing the same room, all or a desired portion of respective UE identifiers of respective UEs of the other members or partners also can be recorded by the entity management system 112. The ESMC 120 can generate a security code that can be used by the UE 102 and associated subscriber to facilitate controlling access to the subscriber's room at the service entity 114. The entity management system 112 can be programmed in any desired manner of the various ways to manage the security code.

In an aspect, an application (e.g., services integration application) can be downloaded to the UE 102, for example, during registration. The application can employed to install and configure the UE 102 to utilize a UE-side enhanced services management component (UE-ESMC) 122 that can be used to facilitate integration of the subscriber's services (e.g., wireless communication services 106, wireline communication services 108) and the service entity's services (e.g., communication services 116 and local communication services 118), use desired integrated communication services, controlling access to respective areas (e.g., dedicated areas, such as the subscriber's room), etc.

In one embodiment, to facilitate using the UE 102 to control the lock on the subscriber's door, the security code can be a visible code that is provided to the subscriber and/or UE 102. At a desired time (e.g., during registering), the UE 102 can be configured to have a key programmed to be an unlock key that can be used (e.g., pressed) to unlock the room door of the subscriber. When the subscriber manipulates (e.g., presses) a preprogrammed unlock key on the UE 102, the subscriber can be prompted to enter the security code into the UE 102 via an interface (e.g., keypad, touchscreen keypad) on the UE 102. In response to entering and sending the security code, the UE 102, employing the UE-ESMC 122, can transmit both the subscriber's UE identifier and the security code to the ESMC 120 via the AP 110 (e.g., when AP 110 is the AP providing coverage in the location where the door lock is located) or another AP that is serving the UE 102, wherein the ESMC 120 can send a command to the room door to unlock the room. By having the subscriber enter a security code in addition to pressing an unlock key on the UE 102, secure control of the door lock and room security can be facilitated.

In another embodiment, the security code can be an invisible code that can be embedded in the UE 102 (e.g., in the UE-ESMC 122). In this instance, the subscriber can manipulate the unlock key on the UE 102 to unlock the room door, wherein the subscriber is not required to enter the security code into the UE 102 to unlock the door. As the security code is embedded in the UE 102, when the subscriber manipulates the unlock key, the UE-ESMC 122 can send the security code and UE identifier to the ESMC 120, which can send an unlock command to unlock the subscriber's room door.

In still another embodiment, the security code is not provided to the subscriber or embedded in the UE 102, but can be programmed in the lock on the subscriber's room door. When the subscriber manipulates the unlock key on the UE 102, the UE identifier can be sent by the UE 102, as facilitated by the UE-ESMC 122, to the ESMC 120, and the ESMC 120 can send a command to unlock the door, and the door lock can be unlocked.

In yet another embodiment, the security code can be a radio-frequency identification (RFID) tag, comprising a specified value (e.g., security number), that can be attached (e.g., snapped onto, pasted to) the UE 102. When the subscriber manipulates the unlock key, the UE 102, as facilitated by the UE-ESMC 122, can transmit the UE identifier to the ESMC 120, and the ESMC 120 can compare and match the received RFID security code with the reader (e.g., having a specified value) that can be embedded in the room door lock of the subscriber's room. When there is a match between the received RFID tag and the reader, the ESMC 120 can send an unlock command to the door lock on the room, and the door lock can be unlocked in response to the received unlock command.

In an aspect, the door lock on the subscriber's room can be controlled based at least in part on location of the UE 102, in addition to the UE identifier associated with the UE 102 and the security code. For instance, if the ESMC 120 receives a request to unlock the door from the UE 102, but the ESMC 120 detects that the UE 102 is in a location that is relatively far away from the door lock (and associated room), the ESMC 120 can send an alert or prompt message to the UE 102 to notify the subscriber that a door unlock request was received by the UE 102 and prompt the subscriber to verify that the door unlock request was desired by the subscriber and/or request authentication information or credentials from the subscriber to verify that the subscriber (or other authorized person) is actually the person making the door unlock request. The location of the UE 102 can be identified by the ESMC 120 using, for example, GPS, Assisted-GPS (AGPS), Cell ID, WI-FI, and/or Indoor, etc., location techniques and/or identifying the particular AP that is serving the UE 102 at the time of the request, wherein the location of the coverage area of the AP can indicate the location of the UE 102. Such features of the disclosed subject matter can facilitate reducing undesired unlocking of the door in response to accidental or undesired door unlock requests or undesired door unlock requests by unauthorized persons.

In certain instances, the subscriber(s) may not have all the UEs presented during the check-in time; in such instances, the subscriber(s) will have to provide all room members' UE identifiers to be registered in the ESMC 120. In such instances, there are a number of techniques that can be employed to preprogram these UEs so that they can be utilized as the room keys to the subscriber(s) room with the service entity 114. As desired, in an aspect, the security code can be the same for all UEs associated with a group or there can be different security codes for all or a desired portion of the UEs.

In one embodiment, the ESMC 120 can send a message (e.g., SMS message, MMS message) to each of the UEs. The message can comprise information (e.g., web site address, link to the web site, security code, and/or other information) that can direct the UEs to a web portal associated with the ESMC 120 to get the UEs preprogrammed to be used to control the lock on the room door. As desired, the security code can be available and/or displayed for a predefined amount of time (e.g., 1 minute, 2 minutes, 3 minutes, . . . ) after which the security code can be erased.

In another embodiment, when the UE(s) are equipped with a near field communication (NFC) chipset, the UE (e.g., 102) that has been preprogrammed can synchronize with other UEs using NFC capability. Because all possible guests' UE identifiers were pre-registered in the ESMC 120 during the registration time, a UE with a UE identifier that was pre-registered can be configured to control locking/unlocking the room door, but a non-registered UE identifier will not be able to unlock the room door.

In still another aspect, the ESMC 120 can track and log all lock and unlock transactions of a room by respective UE identifiers, room number, door lock identifier and/or security code, for example. Information relating to the transaction can be stored in a data store associated with the ESMC 120. When desired, the information, or a desired portion thereof (e.g., as controlled by the service entity 114 and/or the subscriber) can be provided to the subscriber of UE 102 and/or another authorized person(s).

In yet another aspect, if the UE 102 is stolen or lost, the subscriber can choose to remove the UE identifier from the authorized list or change the security code, and the ESMC 120 can update the information to make such changes to the subscriber's profile stored in the data store associated with the ESMC 120. For example, the subscriber can request a service entity employee (e.g., employee at the front desk of the hotel) to reprogram the lock key code for the subscriber's room. The subscriber also can login to a service entity's portal (e.g., using another UE) to request to the ESMC 120 to reprogram the subscriber's security key code (e.g., using the security code and the UE identifier) or remove the UE identifier from the authorized list stored in the data store. If other authorized UEs use the same security code and the code is changed, the ESMC 120 can generate and send an alert message, comprising the new security code, to those other UEs in the group, wherein those UEs can be re-programmed to be used as a room key, as more fully disclosed herein.

In an aspect, when the subscriber de-registers or checks out with the service entity 114, the ESMC 120 can re-program the lock on the room of the subscriber to a desired security code, and the ESMC 120 can update and store the information relating to the room with the new security code. For instance, the lock can be re-programmed after a de-registration or checkout message is received (e.g., at the front desk or via a self-check-out service, associated with the ESMC 120).

In another aspect, when the de-registration or check out time is approaching but no de-registration or check out action is performed, the ESMC 120 can send (e.g., automatically send) an alert message to the subscriber's UE 102 that the lock will soon be re-programmed unless an extension request is initiated by the subscriber. The subscriber can use the UE 102, and UE-ESMC 122, to de-register or check out, or can issue an extension request, and such action or request can be sent from the UE 102 to the ESMC 120 for processing. In one aspect, the subscriber, using the UE 102 with the UE-ESMC 122, can even request to extend the registration (e.g., stay at the hotel) for a desired period of time (e.g., one or more days) by as little as a single manipulation of (e.g., click on) an extension request button that can be displayed on the display screen (e.g., touch screen) of the UE 102.

In still another aspect, as desired by the service entity 114, the ESMC 120 can re-program the door lock with a universal open code or more than one level of security code, for example, to allow maintenance activities, especially when the room is not occupied (e.g., by the subscriber). Whenever the door lock is locked or unlocked, the ESMC 120 can track these door transactions and store them in a central log that can be employed to facilitate tracking and maintaining all events or transactions relating to the door lock and associated room. As desired, all or a desired portion of the events can be shared with the subscriber by the service entity 114 via the ESMC 120. For example, all or a desired portion of the activities involving the subscriber and others in his group (e.g., family members) and/or other activities (e.g., maid cleaning activities, wherein the maid can use a different security code than the subscriber so the subscriber can learn when the room is being cleaned, however, the maid's security code will not provided to the subscriber and the subscriber will not be able to detect what security code the maid is using or has used) can be provided to the UE 102 (or other communication device associated with the subscriber) by the ESMC 120. The other activities can be respectively associated with different security codes or indicators that can be tracked and logged in the central log by the ESMC 120, wherein the different security codes or indicators can facilitate providing information to the subscriber (e.g., a desired portion of the information can be provided to the subscriber) and service entity 114 as to what types of activities have been performed in relation to the room, when such activities occurred, who participated in the activities, etc.

In yet another aspect, the UE 102 can be integrated with the portal services associated with the ESMC 120 and service entity 114. Integration of the UE 102 with the portal services and operation of the UE 102 to access the portal services can be facilitated by the ESMC 120 and UE-ESMC 122. For instance, at a desired time (e.g., during registration of the subscriber), the UE 102 can be programmed with a soft key/ hot key, wherein programming and configuring of the UE 102 to have the soft key/hot key can be facilitated by the ESMC 120 and UE-ESMC 122. When the soft key/hot key is manipulated (e.g., pressed or clicked on), the UE 102 can be connected to the portal associated with the ESMC 120 and service entity 114, and the subscriber can be authenticated automatically, or, if additional security is desired, the subscriber can be requested/required to enter the security code associated with the subscriber's room or other authentication credentials, wherein the ESMC 120 can compare the received UE identifier, security code or authentication credentials to facilitate authenticating the UE 102 and associated subscriber. When authenticated, the ESMC 120 can grant (e.g., automatically grant) specified access rights to the UE 102 to allow the UE to access the portal and associated services. When connected and granted access to the portal and associated services, the UE 102, utilizing the UE-ESMC 122, can operate in a same or similar manner as a remote control unit and TV, with menus associated with the portal, and the subscriber can utilize the UE 102 to access the portal and its services as if subscriber is in the room using the remote control to interact with the TV menu. When the UE 102 is connected to the service entity's portal, all portal services (e.g., hotel guest services) can be available to the UE 102 and associated subscriber. The portal services can include, but are not limited to, for example, gambling services (if offered in a casino), a view of charge details, security code; show booking, restaurant reservations, hotel event schedules, check out, taxi services, room service pre-scheduling, the current status of the room (e.g., room is being cleaned, maintenance is being performed in the room, etc.), a view of room lock and unlock transactions, wake up call scheduling, a view/invocation of other integrated services such as disclosed herein, etc.

In accordance with various aspects, the UE 102 can be integrated with the communication system in the entity management system 112 associated with the service entity 114. When the UE 102 is registered in the entity management system 112, the UE identifier (e.g., mobile phone number) of the UE 102 can be provisioned into a list (e.g., whitelist) that can be provided to all or a desired portion of the APs (e.g., femtocell, WI-FI (e.g., for dual mode UEs), etc.), wherein the list can comprise UE identifiers and/or other related information indicating UEs (e.g., 102) that are allowed to connect to the APs (e.g., 110) and communicate using the communication system of the entity management system 112. This can facilitate ensuring that the subscriber can have premium communication connectivity across the entire area (e.g., premises) of the service entity 114.

For instance, after registering or checking in, the subscriber can learn his/her room set up, the room's communication device identifier (e.g., room's phone number), and/or other available premium communication services provided by the service entity 114. For example, when desired by the subscriber, the subscriber can accept the integration of the subscriber's UE 102 and associated UE identifier into a unified communication (UC) portfolio provided by the service entity 114 and/or forward the room's communication device identifier to the subscriber's UE 102, or vice versa, depending at least in part on the subscriber's desires (e.g., as desired, some of the premium communication services may involve a monetary charge depending at least in part on the subscriber's VIP status in relation to the service entity 114). In an aspect, as desired, all or a desired portion of the communication services (and applications) of the service entity 114 can be arranged as a host service by the communication service provider that provides the communication services 116 and local communication services 118. In still another aspect, the UE 102, utilizing the UE-ESMC 122, can be integrated with the promotion services presented by the service entity 114 to receive notification, via messages and/or alerts (e.g., text message, email, web links, voice calls, etc.) sent from the ESMC 120 to the UE 102, regarding promotions, including, for example, coupons, special events, and/or special bundled offerings, during the time that the UE 102 and associated subscriber is registered with the entity management system 112 (and service entity 114).

In an aspect, if the subscriber desires not to choose to integrate the service entity's communication services with the subscriber's communication services (e.g., home communication services, including wireless communication services 106 and/or wireline communication services 108), as desired, the subscriber can still use the UE 102, and UE-ESMC 122, to integrate the subscriber's calendar items with (e.g., into) the service-entity-provided calendar services associated with the ESMC 120 (e.g., the subscriber can port desired business meetings into the hotel-stay electronic calendar).

In accordance with an embodiment, the ESMC 120 and UE 102, including the UE-ESMC 122, can be employed to integrate the subscriber's communication services (e.g., home communication services, including wireless communication services 106 and/or wireline communication services 108) with the service entity's services (e.g., communication services 116, local communication services 118).

Figure 2:
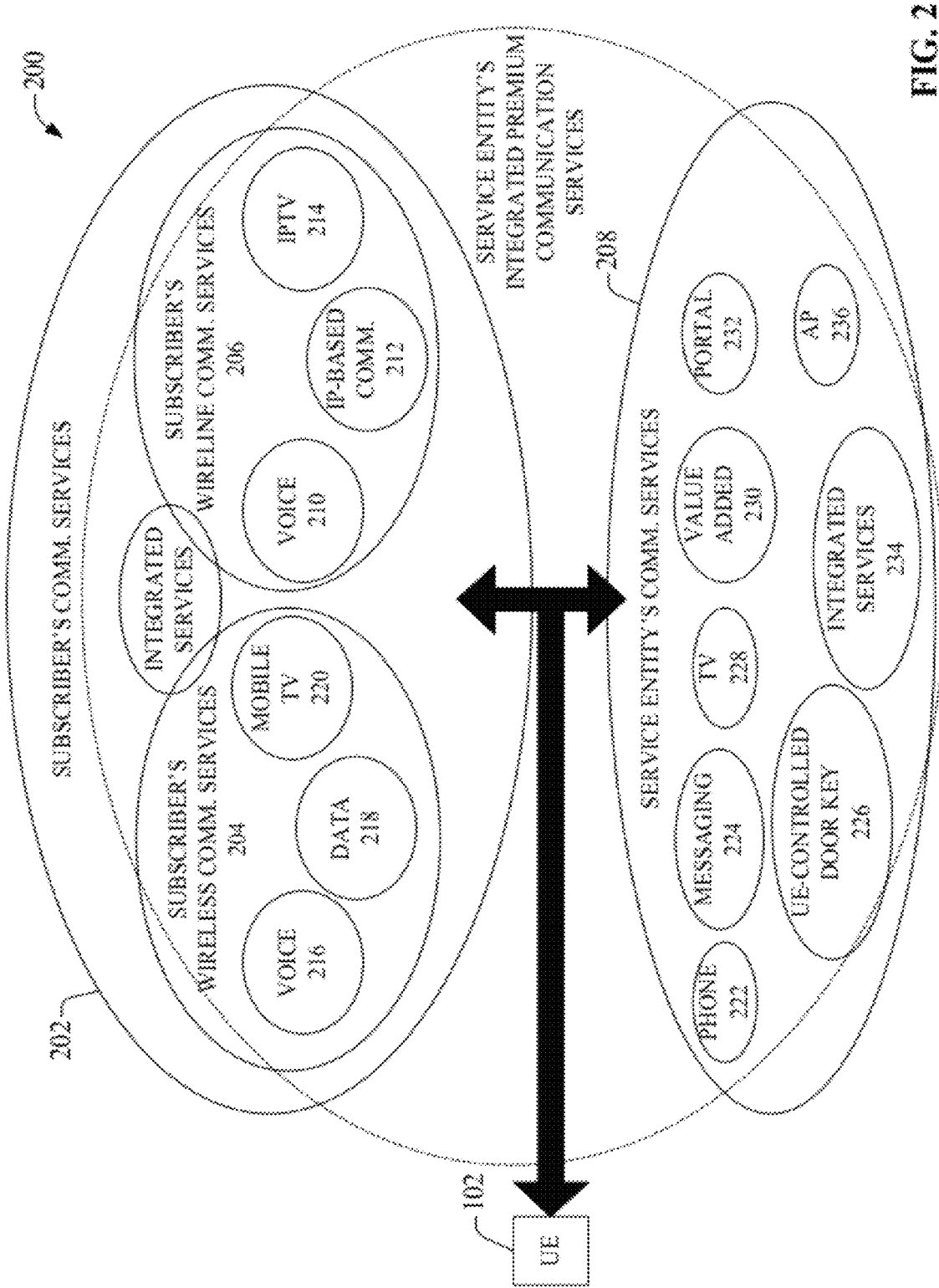
FIG. 2 depicts a diagram of an example set of UC services in accordance with various aspects of the disclosed subject matter.

Referring briefly to FIG. 2 (along with FIG. 1 and system 100), depicted is a diagram of an example set of UC services 200 in accordance with various aspects of the disclosed subject matter. In an aspect, when the subscriber registers or checks in with the entity management system 112 of the service entity 114 or is otherwise associated with the entity management system 112 and the service entity 114, and the subscriber's UE 102 is registered with the entity management system 112, at least a portion of the subscriber's own communication services 202 (e.g., subscriber's home or personal communication services), which can include the subscriber's wireless communication services 204 and/or subscriber's wireline communication services 206, can be integrated with the service entity's communication services 208 by bridging the subscriber's own communication services 202 with the service entity's communication services to create the set of UC services 200. The subscriber's own communication services 202 can comprise, for example, wireline communication services 206, such as voice services 210, IP-based communication services 212 (e.g., Internet services), and/or IPTV services 214, and wireless communication services 204, including wireless voice services 216, wireless data services 218, and/or wireless TV services 220 (e.g., mobile TV). The service entity's communication service can comprise, for example, phone services 222, messaging services 224, UE-controlled door lock key 226, TV 228 (e.g., IPTV), value added services 230, portal services 232, other integrated services 234, and/or AP connectivity 236 (e.g., WI-FI and/or femtocell connectivity across the all or a desired portion of the premises of the service entity 114).

Figure 3:
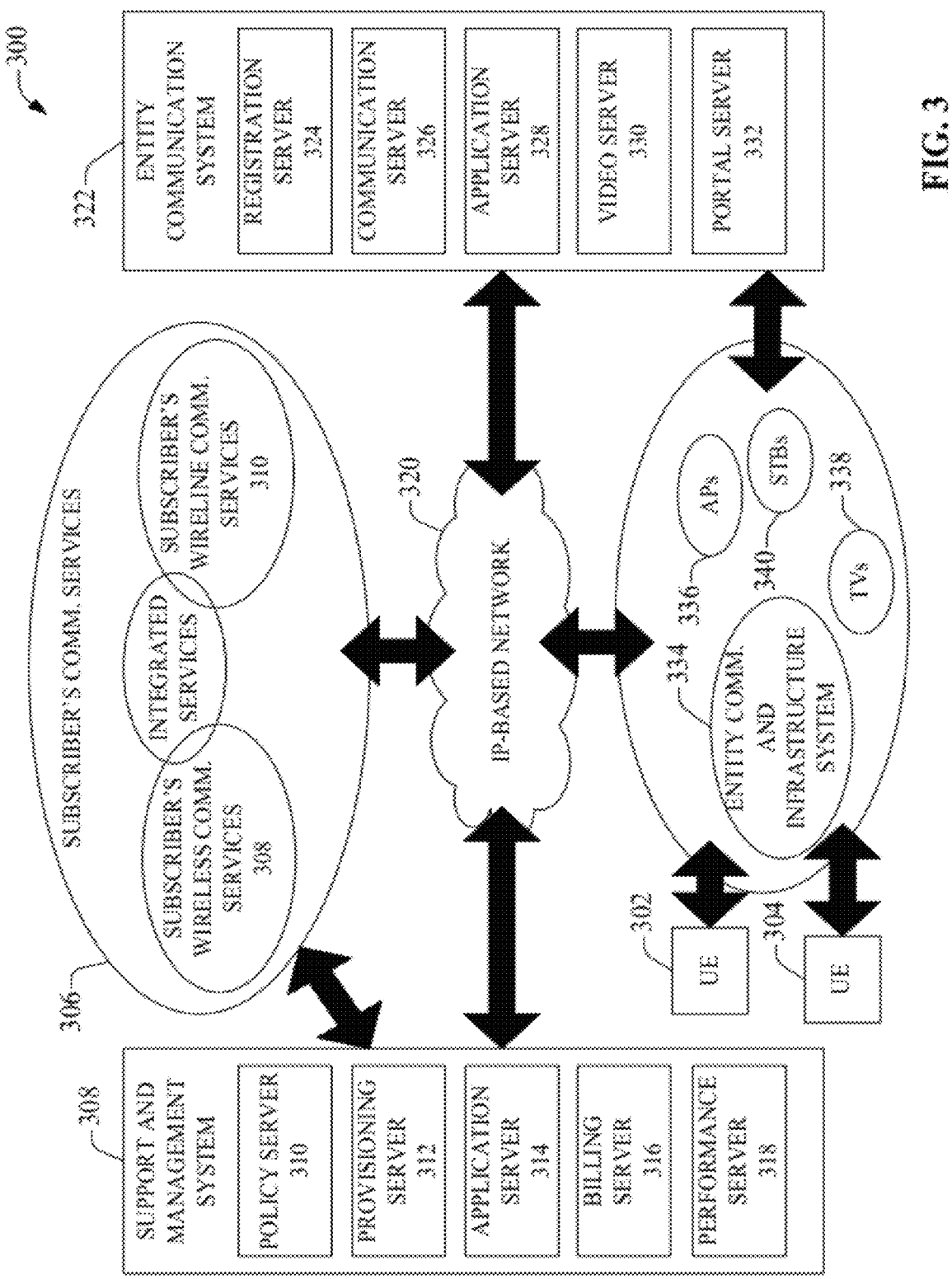
FIG. 3 illustrates a block diagram of an example system that can facilitate provision of integrated communication services to a subscriber(s) in accordance with various aspects of the disclosed subject matter.

Referring briefly to FIG. 3 (along with FIGS. 1 and 2), illustrated is a diagram of an example system 300 that can facilitate provision of integrated communication services to a subscriber(s) in accordance with various aspects of the disclosed subject matter. The system 300 can comprise a desired number of UEs, such as UE 302 and UE 304, which can be respectively associated with respective subscribers, and can be used to facilitate provision of integrated communication services, as more fully disclosed herein. One or more of the subscribers associated with the UE 302 and/or UE 304 can have a subscription with service provider, wherein the service provider can provide the subscriber with a set of subscriber's communication services 306, comprising wireless communication services 308 (wireless comm. services) and wireline communication services 310 (wireline comm. services), wherein, for example, the wireline communication services 310 can be provided to the subscriber at the subscriber's desired premises (e.g., home, office, etc.). In an aspect, the wireless communication services 308 and wireline communication services 310 can be integrated with each other.

System 300 also can include a support and management system 308 of the subscriber's service provider that can manage provision of the subscriber's communication services 306 to the subscriber and billing of the subscriber for those communication services 306. For example, the support and management system 308 can include one or more policy servers, such as policy server 310 that can facilitate enforcing desired policies relating to provision of and billing for communication services; one or more provisioning servers, such as provisioning server 312, that can provide communication services to communication devices (e.g., UE 302, home phone, subscriber's TV, subscriber's STB, etc.) associated with the subscriber; one or more application servers, such as application server 314, that can facilitate execution of desired applications to facilitate providing the desired communication services to the subscriber on the subscriber's communication device(s); one or more billing servers, such as billing server 316, that can monitor and track the provision of communication services to the subscriber to facilitate accurate billing of the subscriber for the communication services 306 provided to the subscriber; and/or one or more performance servers, such as performance server 318, that can facilitate monitoring performance of servers operating in the support and management system 308 to facilitate desired provision of communication services 306 to the subscriber's communication devices.

In an aspect, the support and management system 308 can be communicatively connected to an IP-based network(s) 320 that can comprise public and/or private IP-based networks that can employ desired components to facilitate wired and wireless communication between communication devices associated with the IP-based network(s) 320. The IP-based network(s) 320 can employ desired components to facilitate wired and wireless communication between communication devices associated with the IP-based network(s) 320, including facilitating providing the communication services 306 to communication devices of the subscriber.

In another aspect, an entity communication system 322 that can be employed by the service entity (e.g., service entity 114), can be communicatively connected to the IP-based network(s) 320, and can comprise desired computers and servers to facilitate communications between communication devices that are associated with (e.g., communicatively connected) to the communication system 322 and/or are associated with the IP-based network(s) 320. For instance, the entity communication system 322 can include one or more registration servers, such as registration server 324, that can be employed to manage registration of UEs and associated subscribers when the subscribers are registered or checked in with the service entity 114; can comprise one or more communication servers, such as communication server 326, that can be employed to manage (e.g., provision, control, facilitate) communications by communication devices (e.g., UEs, IPTVs, STBs, APs, etc.) associated with the entity communication system 322; can employ one or more application servers, such as application server 328, that can manage, provide, and/or execute applications (e.g., word processing applications, communication-related applications, registration-related applications, electronic gaming applications, etc.) relating to the entity communication system 322, to facilitate operations by the entity management system 112; can contain one or more video servers, such as video server 330, that can be employed to manage and provide video or other media information (e.g., movies, television programming, music, electronic gaming, etc.) to communication devices associated with the entity communication system 322; one or more portal servers, such as portal server 332, that can be employed to manage, control access to, and provide portal services for communication devices associated with the entity communication system 322; and/or other desired servers to facilitate managing, performing, and/or providing other functions or information.

The entity communication system 322 can be associated with the entity communication infrastructure and service system 334 (entity comm. infrastructure and service system), wherein the entity communication system can manage providing the service entity's communication services to persons (e.g., subscribers) that are registered with the service entity, as well as providing a desired portion of the service entity's communication services to other persons not registered with the service entity. The entity communication system 322 also can be associated with one or more APs 336 that can be distributed throughout the premises of the service entity 114 to facilitate wireless communication connectivity of communication devices (e.g., UEs) that are located on the service entity's premises and/or are registered with the entity management system 112. The entity communication system 322 also can comprise a plurality of TVs, such as TV 338, and STBs, such as STB 340 associated therewith, wherein the TVs and STBs can be distributed throughout the service entity's premises (e.g., in rooms on the premises) to facilitate provision and presentation of communication services and information to desired persons, such as subscribers. The entity communication infrastructure and service system 334 also can be associated with the IP-based network 320 to facilitate communication between communication devices communicating via the APs 336 and other communication devices associated with the IP-based network 320 and/or the provision of communication services, including a desired portion of the subscriber's own communication services 306, to desired persons, including the subscriber, while registered with the entity management system 112 and/or otherwise communicating via the entity management system 112. It is to be appreciated and understood that the entity communication system 322 and the entity communication infrastructure and service system 334 can be part of the entity management system 112.

In accordance with various aspects, when the subscriber(s) registers or checks in with the service entity 114 via the entity management system 112, the UE identifier(s) (e.g., mobile phone number(s)) of the UE(s) (e.g., UE 102) can be used as a registration key(s). The mobile phone door lock service can be provisioned by the ESMC 120 (e.g., as shown in FIG. 1; not expressly identified or wholly depicted in FIG. 3 for reasons of brevity and clarity), employing a registration server 324 and application server 328. It is to be appreciated and understood that, if the service entity's entity communication system 322 is located and operated inside of the premises of the service entity 114, there is no need to communicate via the IP-based network(s) 320. However, if the service entity's entity communication system 322 is located and operated, at least in part, at a remote location (not shown) or is being hosted by a hosting service provider (not shown), all or at least a desired portion of transactions relating to registration of subscribers, provision of services, etc., can be communicated via the IP-based network(s) 320 to a communication device(s) (not shown) associated with the remote location or hosting service provider.

After the door lock for the subscriber's room is provisioned, the UE identifier for the subscriber's UE (e.g., 102, 302, 304) can be registered with all or at least a desired portion of APs (e.g., 110, 336) being managed by the entity management component 112 depending at least in part on the implementation desired by the communication servers 326, in accordance with a desired implementation by the service entity 114. In an aspect, the portal services can be provisioned, and the subscriber(s) can begin to access all or at least a desired portion of the service entity's communication services via the subscriber's UE.

In another aspect, the subscriber also can elect the desired level of integration of communication services from the UE, the room TV (e.g., using the associated remote control unit), and/or a communication device associated with the entity management component 112 (e.g., a front desk staff computer). If the service entity 114 uses the same communication service provider that the subscriber uses (e.g., for home service), a service integration transaction request can be communicated between the IP-based network(s) 320 and the service provider's entity management system 112. In order to port services successfully, two portability keys can be desired (e.g., required), wherein one portability key (e.g., home portability key) can be related to the subscriber's home or other desired premises or location (e.g., home, work) and another portability key can be related to the service entity's premises). All or a desired portion of subscribers can obtain a home portability key from the subscriber's service provider during the service ordering time for the subscriber's home or other desired premises. The security code, which is associated with the subscriber's room, that the subscriber obtains from the service provider 114 can be used as the other portability key for services relating to the subscriber's room, wherein the home portability key and the service-provider-provided portability key can be used by the subscriber to facilitate integrating the subscriber's own communication services (e.g., 106, 108) and the service entity's communication services (e.g., 116, 118).

In certain instances, a billing event can or may be involved, depending at least in part on type of services, in relation to communication services provided to the subscriber while registered with the service entity 114, wherein the billing event can be managed by the billing system of the service provider that provides the communication services. Once accepted by the subscriber, a desired portion of the subscriber's own communication services (e.g., the subscriber's home location communication services) can be available to the subscriber at the subscriber's room at the premises of the service entity 114. For instance, the subscriber can employ the UE (e.g., 102, 302), the remote control unit and associated TV in the subscriber's room, and/or another communication device (e.g., computer associated with the entity management component 112) to provide the subscriber's personal portability key and the security code associated with the subscriber's room to the entity management component 112, wherein the security code can be translated to derive the subscriber's portability key, and the subscriber's portability key and service entity's portability key can be provided to the service provider to facilitate selection of desired communication services associated with the subscriber's subscription with the service provider and integration of those desired communication services with communication services (e.g., services provided by the service provider and/or local services) provided by the service entity 114.

In another aspect, a service provider 114 can or may offer some value added services to the subscriber, for example, at additional charges to the subscriber. Before the service is provided to the subscriber (e.g., via the UE or other communication device, such as the TV), the ESMC 120 can request that the subscriber enter the security code to indicate acceptance of the additional charge, wherein the additional charge can be applied to the subscriber's account with the service entity 114 or payment of such additional charge can be requested by the ESMC 120. In still another aspect, the subscriber can request at a desired time to disable a value added service or an integrated service, and such service(s) can be disabled at or near the time the subscriber requests to disable or at the time the subscriber de-registers or checks out from the entity management component 112 of the service entity 114, based at least in part on type of service and predefined service policies.

With reference to FIG. 1, in an aspect, in accordance with the desired communication system policies of the service entity 114, when the subscriber's own communication services (e.g., 106, 108) and the service entity's communication services (e.g., 116) are provided by the same service provider (or inter-cooperating service providers), a portion of the wireless communication services 106 and wireline communication services 108 of the subscriber can be integrated with the communication services 116 and local services 118 of the service entity 114, wherein the communication system policies can be based at least in part on resources available to the entity management system 112, cost of providing additional resources, and/or other factors. For example, the service entity 114 can allow the subscriber to integrate a specified number of TV channels from the subscriber's wireline communication services 108 with the service entity's communication services to provide the subscriber the ability to view any of the specified number of TV channels from the subscriber's wireline communication services 108, as selected by the subscriber, in addition to the TV channels provided by the service entity's communication services (e.g., communication services 116) on a TV provided by the service entity 114 to the subscriber (e.g., in the subscriber's hotel room) while registered with the ESMC 120, for example, when the subscriber's wireline communication services 108 are provided by the same service provider that provides the service entity's communication services 116 or when there is inter-cooperation between different service providers that allows the integration of the subscriber's wireline communication services 108 and the service entity's communication services 116 even when those respective communication services are provided by different service providers. As desired, the service entity 114 can allow the subscriber to integrate one or more other TV channels of the subscriber's wireline communication services 108 at an additional cost to the subscriber.

In an aspect, to facilitate integrating the desired subscriber's wireline communication services 108 (e.g., service porting of the desired subscriber's wireline communication services 108), the subscriber can use the UE 102 or TV (and associated remote control unit) in the subscriber's room to log in to the service entity's portal associated with the ESMC 120, wherein the UE 102, employing the UE-ESMC 122, or TV (and associated remote control) can invoke an application programming interface(s) (API(s)) to contact or connect with the communication service provider to select a desired set of eligible communication services to be ported or integrated. For video and/or audio (e.g., music) services, once ported, the current TV menu on the room's TV can add and display a new item called, for example, subscriber's personal channels (e.g., traveler's home channels) (in addition to the current pay per view, video-on-demand (VOD), regular TV channels, etc.). When a button for the subscriber's personal channels is manipulated (e.g., pressed or clicked on), the desired set of eligible communication services can be displayed and the subscriber use the remote control unit associated with the room's TV to select and display any of the subscriber's personal channels on the room's TV.

In another aspect, for voice or messaging services (e.g., Internet email services), the voice services of the service entity 114 can be integrated to the subscriber's Unified Communication (UC) portal so that voice mails, messages, and/or alerts can be viewed from the same UC portal.

In still another aspect, when the service entity 114 does not use the same service provider as the subscriber (e.g., for wireline TV or video services), the UC services can be integrated. For instance, UC services, including the subscriber's email service, email service provided to the subscriber while registered with the entity management system 112 via the service entity 120, subscriber's messaging services (e.g., SMS messages, MMS messages, etc.), messaging services provided to the subscriber while registered with the entity management system 112 via the service entity 120, subscriber's phone services, subscriber's UE phone services, phone services provided to the subscriber while registered with the entity management system 112 via the service entity 120, etc., can be integrated for use by the subscriber.

In an aspect, when the service entity 114 does not use the same service provider as the subscriber, the capability of integration of the subscriber's own TV or video services with the services of the service entity 114 can be determined on a case-by-case basis. In an aspect, if the room's TV is connected to the an IP-based network (e.g., the Internet) and the service entity 114 offers TV anywhere service, the subscriber can or may still be able to enjoy at least a portion of the subscriber's wireline services (e.g., including home TV channels), for example, as long as a charge plan is agreed upon by the subscriber, the subscriber's service provider (e.g., home service provider), and the service entity 114, wherein the provision of the subscriber's wireline services and billing for the charge plan can be facilitated via a broker service (e.g., video broker service). This broker service can be a third party service or an API-based platform, and can facilitate enabling at least some wireline service (e.g., video service) portability for the subscriber's wireline services. In another aspect, if TV anywhere is not available in the subscriber's room, the broker service can arrange a discounted home channel viewing service for the subscriber.

In an embodiment, the ESMC 120 can facilitate offering other communication services (e.g., packaged communication services) to persons (e.g., customers) associated with the service entity 114. As desired, the service entity 114 can charge for such communication services. For example, a school can be conducting a field trip that desires eight consecutive rooms from the service entity 114 (e.g., hotel). Room 1 and 8 are for teachers/chaperones and room 2-7 are for the students. The rule is that no student(s) is allowed to go out the room after 10 PM. In an aspect, the ESMC 120 can provide a door-lock alert service to the teachers/chaperones. All door unlock events for the student rooms can be monitored by the ESMC 120 at desired times, including after 10:00 p.m., and the ESMC 120 can detect and record any door unlock events that occur during the desired times with regard to rooms 2-7. The ESMC 120 can transmit an alert message or signal to the UE(s) 102 of the teachers/chaperones to notify the teachers/chaperones of the detected door unlock event. In another aspect, if a video camera(s) is installed to monitor the area(s) of rooms 2-7 of the service entity 114, the ESMC 120 can provide (e.g., communicate) the video footage relating to rooms 2-7 to the TV(s) in rooms 1 and/or 8 and/or the UE(s) (e.g., 102) of the teachers/chaperones so that the teachers/chaperones can identify the student(s) who is breaching the door(s) to any of rooms 2-7. As desired, for privacy reasons, the ESMC 120 can limit the amount of video footage available to the teachers/chaperones, for example, to video footage over a specified period of time surrounding the detected door unlock event for any of rooms 2-7.

In another embodiment, if, while utilizing the room of the service entity 114, a subscriber learns of and/or perceives (e.g., views) a program (e.g., TV or video program, music program, etc.) on the room's TV (e.g., as part of the integrated services available to the subscriber) and desires to have that program available to the subscriber when the subscriber returns to the place (e.g., home, work office, etc.) where the subscriber's services (e.g., wireline communication services 108) are provided, that program can be made available (e.g., via over the air (OTA) connection, via wireline connection) to the subscriber via the subscriber's communication services or the service entity's communication services. For example, while in the subscriber's room at the premises of the service entity 114, if the subscriber sees a TV program that the subscriber desires to have for future use, the subscriber can use the UE 102 or remote control unit for the room's TV to select that program for immediate or future download to a set-top box (STB) at the place (e.g., home, work office, etc.) where the subscriber receives the subscriber's services (e.g., wireline communication services 108) from the service provider.

Figure 4:
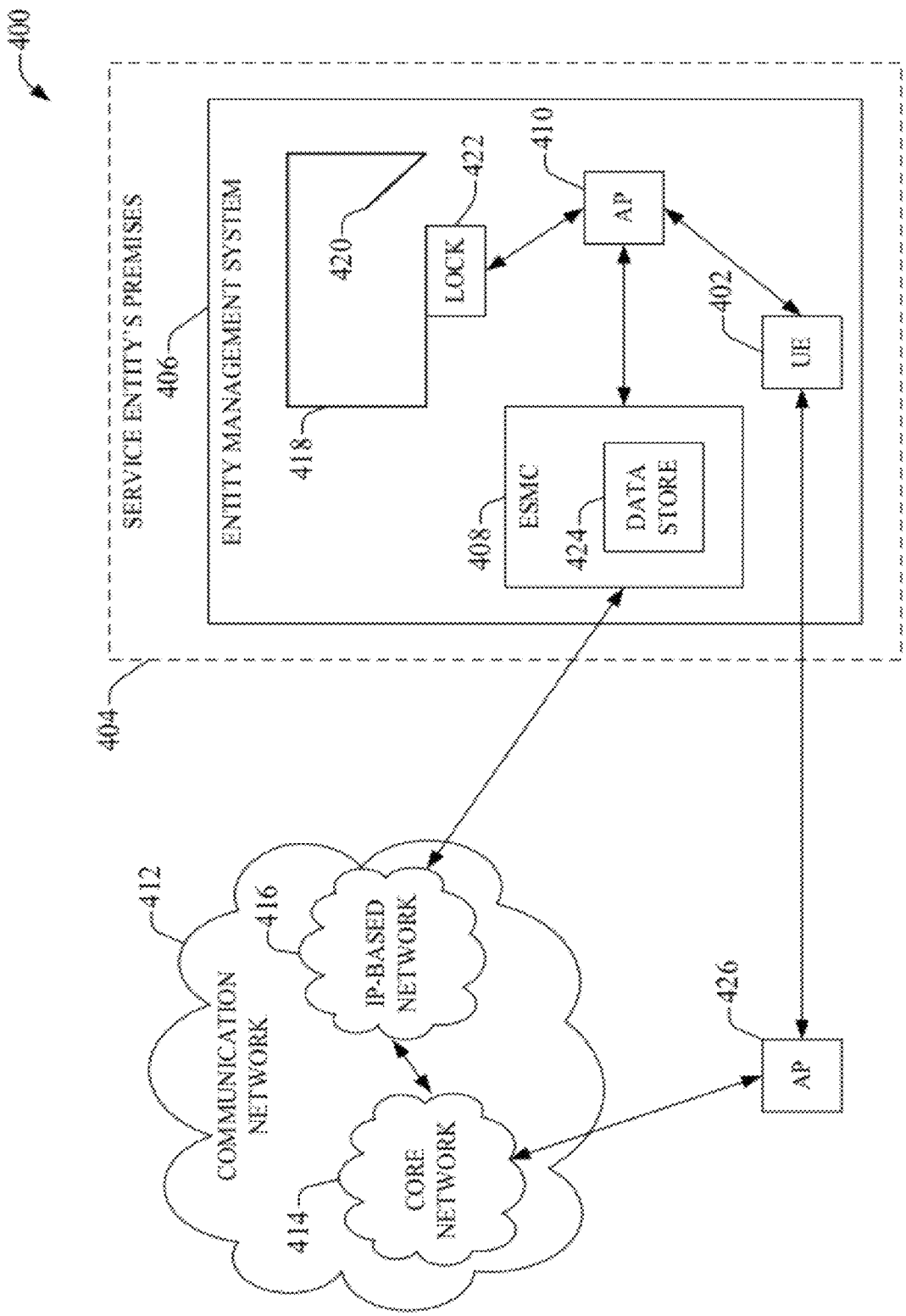
FIG. 4 depicts a block diagram of an example system that can employ user equipment (UE) to facilitate controlling the locking state of a door in accordance with various aspects and embodiments of the disclosed subject matter.

FIG. 4 illustrates a diagram of an example system 400 that can employ a UE to facilitate controlling the locking state of a door in accordance with various aspects and embodiments of the disclosed subject matter. In an aspect, the system 400 can include a UE 402 that can be used to communicate with other communications devices to facilitate voice and data communications, which also can facilitate performing other desired functions, such as controlling a locking state of a door lock (e.g., associated with a room on a service entity's premises 404). The system 400 also can include an entity management component 406 that can cover and perform desired operations and functions, including provision of communication services, controlling access to respective areas (e.g., dedicated areas, such as hotel rooms), security of the service entity's premises, etc., relating to or on behalf of the service entity (e.g., hotel operator, venue operator, etc.), for the service entity's premises 404. The entity management component 406 can comprise an ESMC 408 that can facilitate integration of the subscriber's communication services (e.g., wireless communication services, wireline communication services) and the service entity's communication services, provision of communication services (e.g., to UEs and other communication devices), controlling access to respective areas (e.g., dedicated areas, such as hotel rooms), security of the service entity's premises 404, etc., relating to or on behalf of the service entity. The entity management component 406 also can include one or more APs, such as AP 410 (e.g., femto AP, pico AP, WI-FI AP, etc.), that can be located on or near the service entity's premises 404 and can facilitate communications (e.g., wireless communications) between a UE (e.g., 402) being served by the AP and other communication devices associated with a communication network with which the AP is associated. The one or more APs (e.g., 410) can be directly or indirectly associated with a communication network 412 that can facilitate communication between wired and/or wireless communication devices associated with the communication network 412.

In an aspect, the communication network 412 can comprise a core network 414 (e.g., mobile core network) that can be employed to facilitate communication by UEs associated (e.g., wirelessly connected) with the core network 414 and other communication devices associated with the communication network 412. The core network 414 can facilitate wireless communication of voice and data associated with communication devices, such as UE 402, in the communication network 412. The core network 414 can facilitate routing voice and data communications between UEs and/or other communication devices (e.g., phone, computer, email server, multimedia server, audio server, video server, news server, financial or stock information server, other communication devices associated with an IP-based network 416 (e.g., the Internet), etc.) associated with the communication network 412. The core network 414 also can allocate resources to the UEs (e.g., 402) in the network 412, convert or enforce protocols, establish and enforce Quality of Service (QoS) for the UEs, provide applications or services in the network, translate signals, and/or perform other desired functions to facilitate system interoperability and communication in the wireless communication network. The core network 414 further can include desired components, such as routers, nodes (e.g., SGSN, GGSN, etc.), switches, interfaces, controllers, etc., that can facilitate communication of data between communication devices associated with the communication network 414.

The communication network 412 also can include the IP-based network 416 that can be associated with the core network 414 and can facilitate communications by communication devices associated with the communication network 412 at least in part via communication of data packets (e.g., IP-based data packets) between communication devices that are associated with the communication network 412 using a wired or wireless communication connection in accordance with specified IP protocols.

In an aspect, a wired communication connection between the UE 402 and the IP-based network 416 can be a communication connection that can communicate voice or data, and/or can be a DSL-type or broadband connection facilitated via an Ethernet connection, and/or a wireless communication connection can be facilitated via a connection of the UE 408 to an AP (e.g., 410, 426). The UE 402 can transmit messages via a wired or wireless connection through the IP-based network 416, the core network 414, or other communication networks, to other UEs, or by accessing the user account associated with the UE 402 on the service provider's web site via a wired or wireless communication connection, wherein the web site can allow the UE user to use a UE 402 to send messages (e.g., SMS, MMS, etc.) from the originating address or UE identifier (e.g., MSISDN) associated with the UE 402 via the IP-based network 416 to other UEs associated with the communication network 412.

In an aspect, the subscriber, who has UE 402, can register with the service entity by registering with the entity management component 406 of the service entity via the ESMC 408. The registration of the subscriber and associated UE 402 can relate to the subscriber checking into a room 418, for example, located on the service entity's premises 404, wherein the service entity's premises 404 can comprise a desired number of rooms. Please note that only one room (e.g., 418) is shown for reasons of brevity and clarity. The room 418 can include a door 420 that can be secured by a lock 422, which can be an electromechanical lock that can be controlled at least in part by the ESMC 408.

In accordance with various aspects and embodiments, the lock 422 can be connected via a wired and/or wireless connection to the ESMC 408. For instance, the lock 422 can be communicatively connected to the ESMC 408 via the AP 410 (e.g., via a communication connection with the ESMC 408, which can be an intra-connection within the entity management component 406 and/or a communication connection that is at least in part routed through the communication network 412), a wireline connection with the ESMC 408. The lock 422 can comprise a keypad, card reader (e.g., magnetic card reader), RFID reader, biometric scanner, and/or other components (e.g., other types of interfaces, lock pin or bolt, etc.) to facilitate controlling the locking state of the lock 422. In an embodiment, the lock 422 can comprise an AP (e.g., soft AP) to facilitate WI-FI-direct communication with a WI-FI type AP.

In an embodiment, the UE 402 can be integrated with the entity management system 406 to enable the UE 402 to be usable as a room key by the subscriber to control the locking state of the lock 422 on the subscriber's room door 420. In an aspect, a request to register the subscriber and associated UE 402 can be received by the entity management system 406. Also, a request for a room access key can be provided to the entity management system 406. To facilitate configuring the UE 402 to be used as a room access key, an application can be downloaded to the UE 402 from the entity management system 406, via the ESMC 408, or other desired source (e.g., web site) and initiated by the UE 402. In an aspect, the application can configure the UE 402 to have a designated lock-control button that can be manipulated to control the locking state of the door 422. In another aspect, the ESMC 408 can obtain an access key, comprising a security code, from a data store 424, which as depicted, can be part of the ESMC 408, although it is to be appreciated and understood that, in accordance with other embodiments, the data store 424 can be a component that is partially or wholly maintained outside the ESMC 408. The ESMC 408 can provide (e.g., transmit) that room access key to the UE 402. The ESMC 408 also can registering the UE 402 by registering and storing the UE identifier in the data store 424, associating the room access key and UE identifier, and storing that association (e.g., mapping) in the data store 424, and adding the UE identifier to the list of allowed communication devices (e.g., whitelist) (when such list is employed) on all or a desired portion of the APs that are under the control of the entity management system 406. In an embodiment, the security code and UE identifier (and the association thereof) can be transmitted to the lock 422 and stored in the lock 422 (e.g., in a data store (not shown) in the lock 422)

When the subscriber desires to change the locking state of the lock 422, the subscriber can manipulate (e.g., press) the designated lock-control button on the UE 402. In accordance with various embodiments, as more fully disclosed herein, in response to the manipulation of the lock-control key on the UE 402 by the subscriber, an unlock request comprising the security code and UE identifier can be communicated to the ESMC 408 or, in an embodiment, directly to the lock 422, via an AP (e.g., AP 410) that is serving the UE 402. If the unlock request is being sent to the ESMC 408, the ESMC 408 can compare information, including the security code and UE identifier, in the received unlock request to the stored information, including the stored security code and UE identifier, to identify whether there is a match. If there is a match, the ESMC 408 can determine that the unlock request is valid and can transmit an unlock command to the lock 422 to direct the lock 422 to unlock the lock 422 to allow the door 420 to be opened. If there is no match, the ESMC 408 can determine that the unlock request is not valid and can deny the unlock request.

If the unlock request is being sent directly to the lock 422, the lock 422 can compare information, including the security code and UE identifier, in the received unlock request to the stored information, including the stored security code and UE identifier, to identify whether there is a match. If there is a match, the lock 422 can determine that the unlock request is valid and can unlock the lock 422 to allow the door 420 to be opened. If there is no match, the lock 422 can determine that the unlock request is not valid and can deny the unlock request. As desired, the lock 422 also can provide an indicator (e.g., green LED to indicate the unlock request was validated, red LED to indicate the unlock request was deemed not valid and denied).

In accordance with another embodiment, the UE 402 can be employed to control the locking state of the lock 422 via communication of room lock requests in the core network 414. In an aspect, the UE 402 can generate and transmit a request to unlock the door lock 422 to access the room 418, wherein the request can be generated and transmitted in response to received input (e.g., pressing the designated unlock button on the UE 402) from the subscriber. The request can comprise information, including the security code and the UE identifier. The request can be communicated to the core network 414 (e.g., GSM network) via an AP 426 (e.g., macro or cellular AP), and the request can be forwarded (e.g., routed) by the core network 414 to the IP-based network 416. The IP-based network 416 can communicate the request to the entity management system 404 for processing by the ESMC 408. If the request is identified as a valid unlock request, the ESMC 408 can transmit an unlock command to the door lock 422 through either a wired communication line or a WI-FI-direct communication connection, and the lock 422 can unlock the lock 422 in response to the received unlock command.

In another embodiment, the UE 402 can be employed to unlock the subscriber's door lock 422 using Femtocell connectivity. In an aspect, the UE 402 can generate and transmit a request to unlock the door lock 422 for the room 418, wherein the request can be generated and transmitted in response to received input from the subscriber. The request can comprise information, including the security code and the UE identifier, for example. The request can be communicated to AP 410, which, in this embodiment, can be a femtocell, and can be communicated to a desired AP (not shown), such as a WI-FI type AP, which can facilitate communication of the request to the IP-based network 416. The IP-based network 416 can forward the request to the core network 414, which can communicate the request via a data network (not shown) to the ESMC 408 for processing of the request. If the request is identified as a valid unlock request (e.g., by comparing the received security code and UE identifier with the stored security code and UE identifier associated with the subscriber and room 418), the ESMC 408 can transmit an unlock command to the door lock 422 through either a wired communication line or a WI-FI-direct communication connection, and the lock 422 can unlock the lock 422 in response to the received unlock command. In an alternative embodiment, the WI-FI type AP can forward the request to the ESMC 408 for processing, instead of forwarding the request to be sent via the communication network 412.

In still another embodiment, the UE 402 can be employed to provide control of the door lock 422 using an RFID tag, which, for example, can be attached to the UE 402, or NFC, if the UE 402 has NFC functionality. In an aspect, the UE 402 can generate and transmit a request to unlock the door lock 422 for the room 418, wherein the request can be generated and transmitted in response to received input from the subscriber. The request can comprise information, including the security code and/or the UE identifier, for example, wherein, if an RFID tag is being employed, it is not necessary for the request to include the security code, as the RFID tag can include the security code. When the UE 402 and the lock 422 can communicate via NFC, the request can be communicated to the lock 422 for local processing. Alternatively, the request can be sent from the UE 402 to the ESMC 408 via a desired communication path (e.g., from the UE 402 to the ESMC 408 via an AP, such as AP 410, through the service entity's communication network (e.g., local communication network) and/or the communication network 412). The lock 422 or the ESMC 408 can evaluate information in the received request and/or obtain additional information, for example, by communicating with an RFID tag to receive the security code, if an RFID tag is being employed, to facilitate verifying that the unlock request is valid. If the request is identified as a valid unlock request (e.g., by comparing the received security code and UE identifier with the stored security code and UE identifier associated with the subscriber and room 418), the lock 422 can unlock to allow access to the room 418 when local lock control is employed, or the ESMC 408 can transmit an unlock command to the door lock 422 through either a wired communication line or a WI-FI-direct communication connection, and the lock 422 can unlock the lock 422 in response to the received unlock command.

In yet another embodiment, the UE 402 can communicate with a WI-FI-direct AP to facilitate controlling the locking state of the lock 422. In an aspect, the UE 402 can generate and transmit a request to unlock the door lock 422 for the room 418, wherein the request can be generated and transmitted in response to received input from the subscriber. The request can comprise information, including, for example, the security code and the UE identifier. The request can be communicated to a WI-FI-direct AP or router, and the WI-FI-direct AP or router can communicate the request to the ESMC 408 for processing. If the ESMC 408 verifies the request and it is deemed valid, the ESMC 408 can generate and communicate an unlock command, which can be sent to the WI-FI-direct AP or router (or other routing device(s) in the service entity's communication system) and forwarded to the lock 422, and the lock 422 can transition to the unlocked state in response to the received unlock command.

Figure 5:
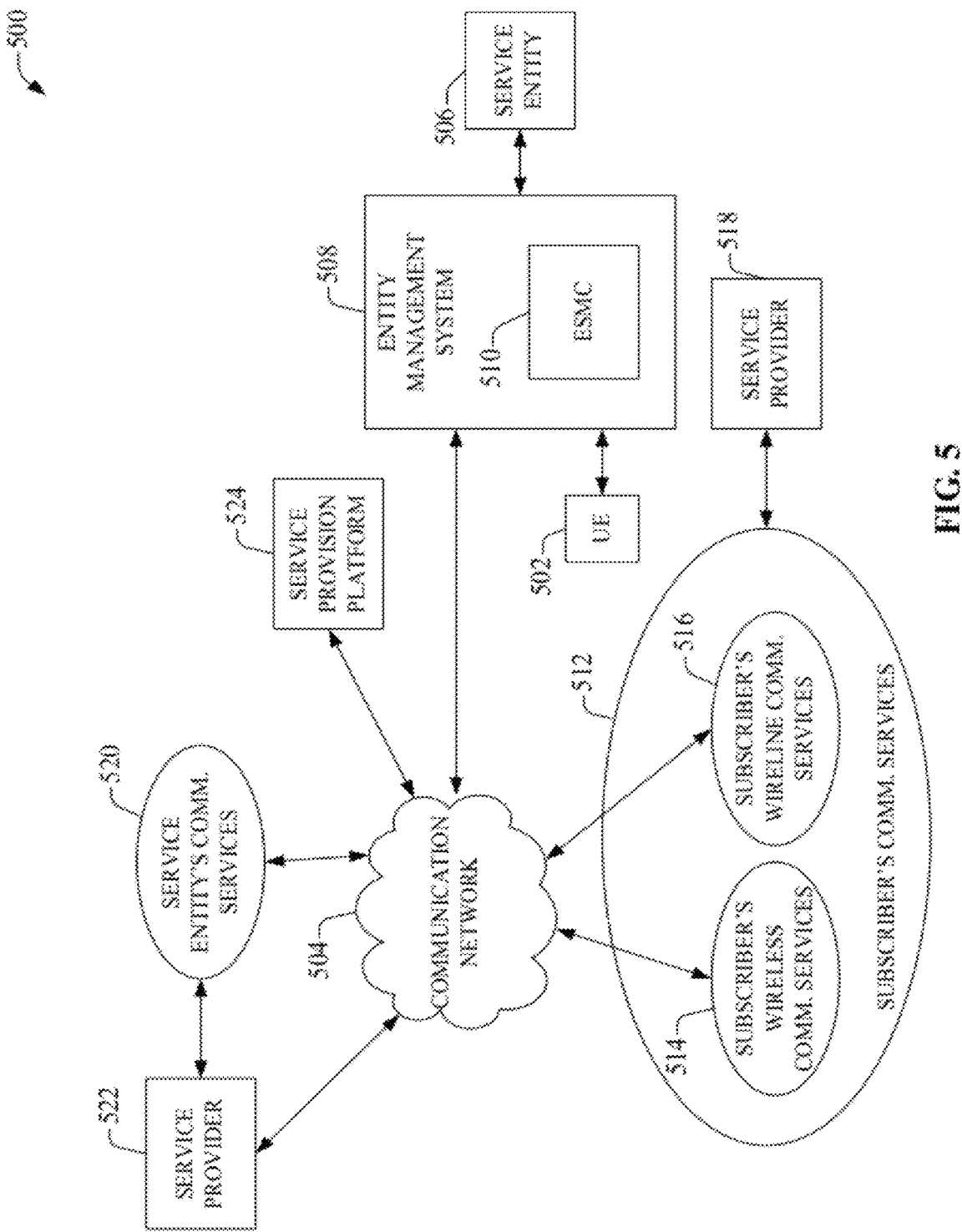
FIG. 5 illustrates a block diagram of an example system that can employ a service broker to facilitate provisioning integrated communication services in accordance with various embodiments and aspects of the disclosed subject matter.

FIG. 5 illustrates a diagram of an example system 500 that can employ a service broker to facilitate provisioning integrated communication services in accordance with various embodiments and aspects of the disclosed subject matter. The system 500 can include UE 502 that can communicate with other communication devices via a communication network 504, and/or, when the UE 502 is on the premises of a service entity 506 and/or is registered with the entity management system 508, can communicate with other communication devices using the communication system of the entity management system 508. The entity management system 508 can include an ESMC 510 to facilitate controlling operations, including communication-related operations, for the entity management system 508. The subscriber associated with the UE 502 can have a subscription for subscriber's communication services 512 (subscriber's comm. services), comprising wireless communication services 514 (wireless comm. services) and wireline communication services 516 (wireline comm. services), which can be provided by a service provider 518. The service entity 506 can have a subscription to receive service entity's communication services 520 (service entity's comm. services), wherein the service provider 522 for the service entity's communication services 520 can be different from, and/or is not a inter-cooperating service provider with, the service provider 518 that provides the subscriber's communication services 512 to the subscriber.

In an aspect, the system 500 can comprise a service provisioning platform 524 that can facilitate providing at least a portion of the subscriber's communication services 512, including at least a portion of the wireline communication services 516, to the subscriber while the subscriber is in a location other than the location (e.g., subscriber's home, work office, etc.) where the subscriber's wireline communication services 516 are normally provided, such as when the subscriber is at the premises of the service entity 506 and/or is registered with the entity management system 406. The service provisioning platform 524 can be operated by a third party service or can comprise an API-based platform to facilitate accessing and providing at least a portion of the subscriber's communication services 512 to the subscriber at the disparate location (e.g., subscriber's room at the service entity's premises).

For instance, if the subscriber's room's TV is connected to the an IP-based network (e.g., the Internet) and the service entity 506 offers TV anywhere service, the subscriber can or may still be able to enjoy at least a portion of the subscriber's wireline communication services 516 (e.g., including home TV channels) (as well as the subscriber's wireless communication services 514), for example, as long as a charge plan is agreed upon by the subscriber, the subscriber's service provider 518 (e.g., home service provider), and the service entity 506, wherein the provision of the subscriber's wireline services and billing for the charge plan can be facilitated via a broker service (e.g., video broker service). This broker service can facilitate enabling at least some portability of the subscriber's wireline communication services 516 (e.g., video service).

In another aspect, if TV anywhere is not available in the subscriber's room with the service entity 506, the broker service can arrange a desired home channel viewing service (e.g., discounted home channel viewing service) for the subscriber to be used while the subscriber is registered with the service entity 506 (e.g., used by the subscriber on communication devices available at the premises of the service entity 506).

The subject specification has a number of advantages over conventional communication systems, methods, and devices. For instance, the subject specification, by integrating the subscriber's communication services (including at least a portion of the subscriber's wireline communication services) with the communication services of a service entity, can enhance service differentiation and revenue opportunities for service entities and service providers as, for example, service entities can have the capabilities to offer tiered premium communication services to resident or registered guests, as compared to conventional systems and methods. The subject specification also can enable travelers to be provided with top class premium communication services, which can improve customer satisfaction and provide customers with a unique customer experience, as compared to conventional systems and methods. The subject specification also can allow communication service providers to offer high margin value added communication services (in addition to the communication infrastructure and basic services) to customers without regard to the location of the customer, which can provide new and improved revenue opportunities with the offer of higher margin vertical services, as compared to conventional systems and methods. These are but a few examples of the benefits of the subject specification.

In accordance with an embodiment of the disclosed subject matter, one or more components (e.g., UE, ESMC, UE-ESMC, entity management component, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); location of a subscriber's UE; whether an unlock door request is a valid request or not and/or whether an unlock door request is from a UE authorized to send such a request; whether a room lock has changed a locking state (e.g., to facilitate tracking locking and unlocking events); etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

Figure 6:
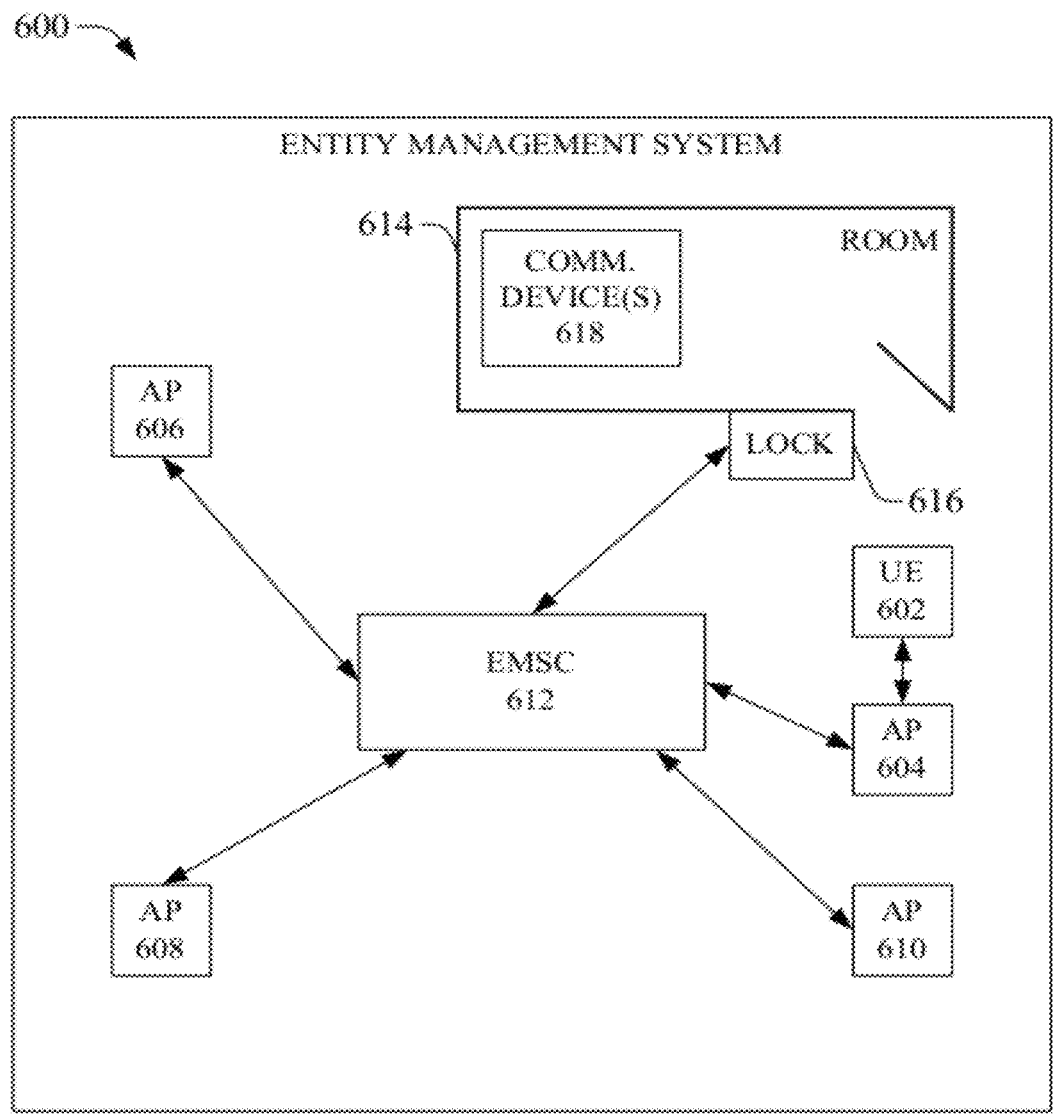
FIG. 6 depicts a block diagram of an example entity management system 600 that can facilitate integration of communication services in accordance with various aspects and embodiments of the disclosed subject matter.

FIG. 6 illustrates a diagram of an example entity management system 600 that can facilitate integration of communication services in accordance with various aspects and embodiments of the disclosed subject matter. The entity management component 600 can manage operations, including operations relating to registration of persons, integration and provision of services, security of the premises, etc., with regard to a premises owned or operated by a service entity (e.g., hotel owner or operator). In an aspect, one or more UEs, such as UE 602, can be associated with the entity management system 600 at desired times (e.g., when the UE 602 is registered with the entity management component 600 and/or when the UE 602 is in a location (e.g., premises of the service entity that is associated with the entity management component 600) wherein the entity management system 600 is operating).

In an aspect, the entity management component 600 can include a desired number of APs, such as AP 604, AP 606, AP 608, and AP 610, that can facilitate wireless communication by or between UEs (e.g., 602) and/or other communication devices (e.g., computer, phone, TV, etc., connected via a wireline connection). The number of APs can be a sufficient number such that the all or at least a desired portion of the service entity's premises can have wireless communication coverage to facilitate communication by UEs while located at or near the premises of the service entity.

In another aspect, the entity management component 600 can include an EMSC 612 that can manage operations, including operations relating to registration of persons, integration and provision of services, security of the premises, etc., and can be associated with (e.g., connected to) the desired number of APs, including AP 604, AP 606, AP 608, and AP 610.

In an aspect, the premises can comprise one or more rooms, such as the room 614, wherein the entity management component 600 can control operations associated with the one or more rooms as well as other areas, such as common areas, of the premises. The room 614 can include a lock 616 that can facilitate securing the room 614 by being controllable to be in a locked state or unlocked state in response to lock-related commands. The EMSC 612 can be connected to the lock 616 via a wireline communication connection or wireless communication connection (e.g., one or more of the APs). The room 614 also can comprise one or more communication devices (e.g., TV (e.g., IPTV), phone, remote control unit, etc.), such as communication device(s) 618 (comm. device(s)), that can be associated with the ESMC 612, and can be employed to provide communication services (e.g., video services, audio services, messaging services, etc.) to the subscriber or other persons associated with the room 614 and/or facilitate communication between the communication devices (e.g., 618), the UE 602 and the communication device 618, and/or other communication devices.

In accordance with various aspects, the EMSC 612, the UE 602, and/or the room's communication devices (e.g., TV, remote control unit) can facilitate integrating at least a desired portion of the subscriber's communication services (e.g., wireless and/or wireline communication services) with the communication services provided by the service entity associated with the entity management component 600, as more fully disclosed herein. The UE 602 also can be employed to facilitate controlling locking state of the lock 616 of the room 614, as more fully disclosed herein.

Figure 7:
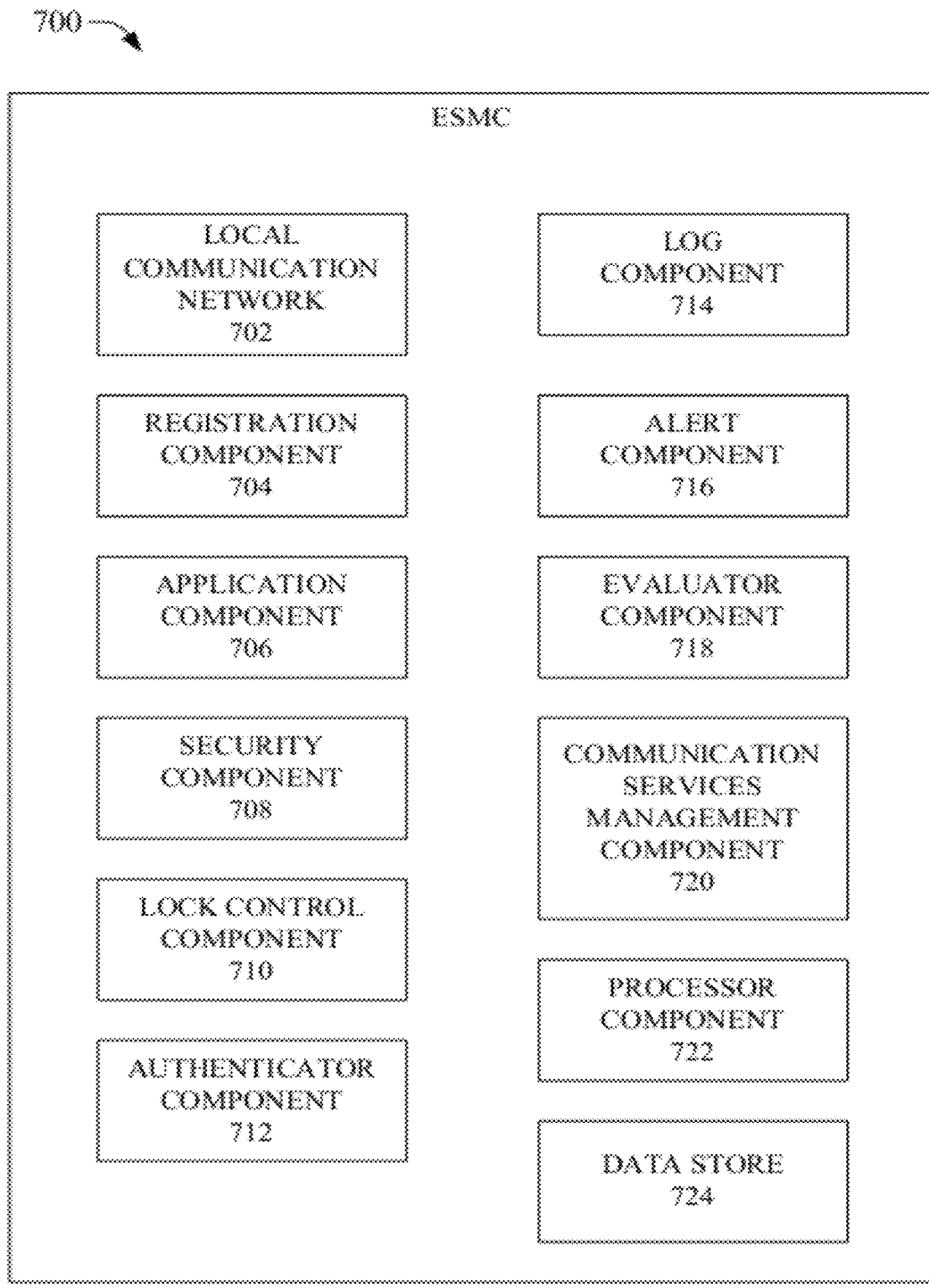
FIG. 7 illustrates a block diagram of an example enhanced services management component (ESMC) in accordance with an embodiment of the disclosed subject matter.

FIG. 7 depicts a block diagram of an example ESMC 700 in accordance with an embodiment of the disclosed subject matter. In an aspect, the ESMC 700 can comprise a local communication network 702 that can comprise a desired number of communication devices (e.g., computers, servers, phones, etc.) and other devices (e.g., routers, switches, etc.) that can be communicatively linked to form the local communication network 702. The local communication network 702 also can be communicatively connected with other communication networks (e.g., IP-based networks, core networks, etc.) to facilitate communications (e.g., voice services, messaging services, etc.) between communication devices associated with the local communication network 702 and other communication devices associated with other networks. The communication devices in the local communication network 702 can be desirably distributed throughout the premises of the service entity.

The ESMC 700 also can contain a registration component 704 that can be used to register persons with the service entity. The registration component 704 can be employed to obtain information (e.g., name, address, UE identifier(s) (e.g., phone number(s)), billing information, etc.) regarding persons that are registering or checking in with the service entity, and obtain and/or provide information (e.g., room number(s), room-related charges, period of stay, etc.) regarding the registration of the persons with the service entity. The information relating to the registration can be stored in a data store 724 associated with the ESMC 700.

In an aspect, the ESMC 700 also can include an application component 706 that can comprise one or more applications (e.g., data processing applications, communications applications, registration applications, security applications, etc.) that can be employed to facilitate operation of the ESMC 700. The application component 706 also can include one or more applications, such as UE-integration applications, that can be provided (e.g., downloaded) to UEs of respective persons associated with the service entity (e.g., registered with the service entity) to facilitate configuring the UEs to integrate the UEs with the entity management system of the service entity. When integrated with the entity management system, an integrated UE of a subscriber can be employed, for example, to control the locking state of a subscriber's room on the service entity's premises, facilitate integration of the subscriber's own communication services with the service entity's communication services, etc.

The ESMC 700 also can comprise a security component 708 that can generate security codes (e.g., generate random security codes) that can be respectively associated with a subscriber or group of subscribers, a UE or group of UEs, and/or a room or a group of rooms. A security code for a subscriber, UE, and/or room, can be stored in the data store 724 (e.g., in a user profile of the subscriber).

In another aspect, the ESMC 700 can include a lock control component 710 that can be used to program locks of respective rooms on the service entity's premises and controlling the locking state of the respective rooms. The lock control component 710 can maintain a room lock in a desired state (e.g., locked state) and can transition the room lock to another desired state (e.g., unlocked state) in response to receiving a valid request to transition the room lock to the other desired state. An authenticator component 712 can operate in conjunction with the lock control component 710 to facilitate controlling the room locks. For instance, when a request to unlock a room lock is received by the ESMC 700, for example, from a UE or a room lock, the authenticator component 712 can compare information, such as the UE identifier and the security code, received as part of the unlock request with stored information, such as the stored UE identifier and security code associated with the room lock, to facilitate authenticating the unlock request. If the received information matches the stored information, the authenticator component 712 can determine the unlock request to be valid and can send a valid indicator to the lock control component 710. In response to the valid indicator, the lock control component 710 can send an unlock command to the room lock to unlock the lock. If the received information does not match the stored information, the authenticator component 712 can determine the unlock request to not be valid and can send an invalid indicator to the lock control component 710. In response to the invalid indicator, the lock control component 710 can deny the unlock request and/or provide a denied indicator to the room lock, which can present the denied indicator (e.g., red LED can light) to the requestor, to provide an indication that the unlock request has been denied.

In still another aspect, the ESMC 700 can contain a log component 714 that can monitor and log events associated with the ESMC 700 and the service entity's premises. For instance, the log component 714 can log events, such as room lock transactions (e.g., door lock events, door unlock events, unlock requests by subscribers, unlock requests by maid service, unlock request by maintenance persons, etc.), communication service use or requests, registration events, etc. The logged events can be stored in the data store 724.

In yet another aspect, the ESMC 700 can comprise an alert component 716 that can communicate (e.g., automatically communicate) a desired alert signal or message to a desired communication device, for example, in response to a particular event occurring. The alert signal can be, for example, an alert message, which can include desired information relating to the alerting event, or can be a visual, audio, or other sensory (e.g., vibration) signal. For example, the alert component 716 can alert a subscriber of a phone call with a phone ring on the room phone or UE, an automated wake-up phone call or signal at a desired time, an alert message regarding a security code can be sent to a UE, an unlock alert signal presented by the room lock when an unlock request has been granted, an unlock-request-denied alert presented by the room lock when an unlock request is denied, etc.

The ESMC 700 also can include an evaluator component 718 that can evaluate information to facilitate making identifications or determinations relating to operations associated with the ESMC 700. For instance, the evaluator component 718 can operate in conjunction with the authenticator component 712 to facilitate authentication of a subscriber or authentication of an unlock request, can facilitate identifying a VIP status of a subscriber registering with the service entity or requesting communication services, etc.

In an aspect, the ESMC 700 can contain a communication services management component 720 that can manage (e.g., control) integration and/or provision of communication services to respective subscribers while registered with the ESMC 700 or otherwise associated with the ESMC 700 and service entity. For instance, the communication services management component 720 can facilitate integrating at least a desired portion of the subscriber's own communication services with the service entity's communication services so that the desired portion of the subscriber's own communication services can be available for use by the subscriber on the service entity's communication devices provided for use to the subscriber (e.g., in the subscriber's room at the service entity's premises) and/or on the subscriber's communication devices (e.g., UE).

In yet another aspect, the ESMC 700 can comprise a processor component 722 that can work in conjunction with the other components (e.g., local communication network 702, registration component 704, application component 706, security component 708, lock control component 710, authenticator component 712, log component 714, alert component 716, evaluator component 718, communication service management component 720, etc.) to facilitate performing the various functions of the ESMC 700. The processor component 722 can employ one or more processors, microprocessors, or controllers that can process data, such as information relating to providing integrated communication services to persons located on and/or associated with the ESMC 700, information relating to integration of subscribers' UEs with the entity management system of the service entity, information relating to controlling the locking state of door locks on the service entity's premises using a UE, information relating to other operations of the ESMC 700, and/or other information, etc., to facilitate operation of the ESMC 700, as more fully disclosed herein, and control data flow between the ESMC 700 and other components (e.g., UEs, other communications associated with the communication network, etc.) associated with the ESMC 700.

The ESMC 700 also can include a data store 724 that can store data structures (e.g., user data, metadata), code structure(s) (e.g., modules, objects, hashes, classes, procedures) or instructions, information relating to providing integrated communication services to persons located on and/or associated with the ESMC 700, information relating to integration of subscribers' UEs with the entity management system of the service entity, information relating to controlling the locking state of door locks on the service entity's premises using a UE, information relating to other operations of the ESMC 700, and/or other information, information relating to other operations of the ESMC 700, etc., to facilitate controlling operations associated with the ESMC 700. In an aspect, the processor component 722 can be functionally coupled (e.g., through a memory bus) to the data store 724 in order to store and retrieve information desired to operate and/or confer functionality, at least in part, to the local communication network 702, registration component 704, application component 706, security component 708, lock control component 710, authenticator component 712, log component 714, alert component 716, evaluator component 718, communication service management component 720, and/or substantially any other operational aspects of the ESMC 700.

Figure 8:
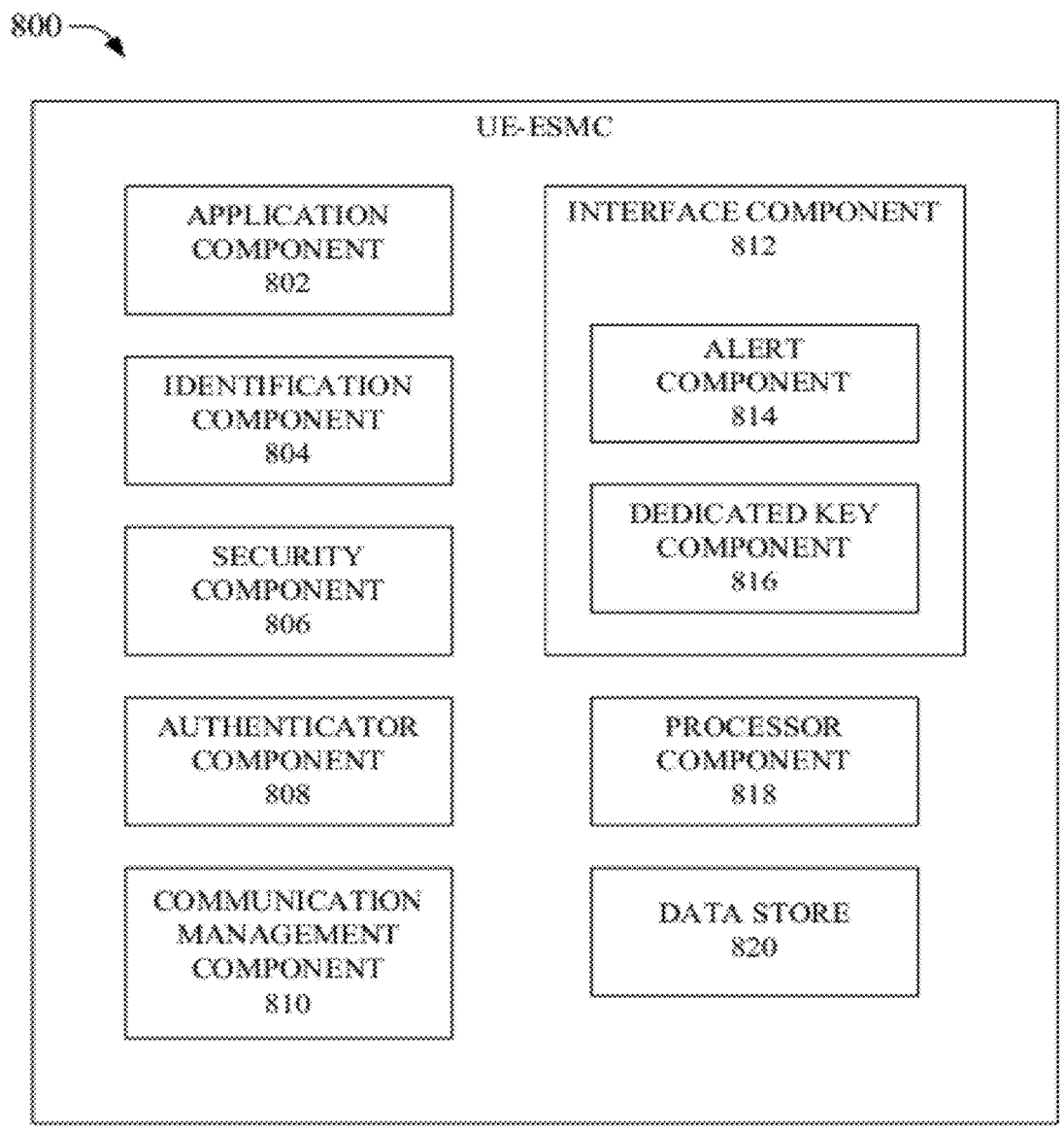
FIG. 8 depicts a block diagram of an example UE-side ESMC (UE-ESMC) in accordance with an embodiment of the disclosed subject matter.

FIG. 8 depicts a block diagram of an example UE-ESMC 800 in accordance with an embodiment of the disclosed subject matter. The UE-ESMC 800 can reside on a UE of a subscriber. In an aspect, the UE-ESMC 800 can comprise an application component 802 that can comprise one or more applications, such as, for example, a UE-integration application, that can be downloaded and received by the UE. The one or more applications can be executed at desired times to facilitate configuring the UE to enable the UE to perform desire functions. For instance, the UE-integration application can be initiated and executed to facilitate configuring the UE to be integrated with an entity management system of a service entity, wherein the UE can be employed to facilitate controlling the locking state of a door lock (e.g., to facilitate using the UE as a room key) for a room (e.g., hotel room) of the service entity being used by the subscriber.

In another aspect, the UE-ESMC 800 can include an identification component 804 that can comprise a desired identifier, such as a unique UE identifier (e.g., phone number), that can be presented (e.g., to other communication devices and/or a communication network) at desired times to facilitate enabling the other communication devices and/or communication network to identify the UE associated with the UE identifier. For instance, the UE identifier can be employed to facilitate authenticating the UE and/or a request sent from a UE to an ESMC and/or door lock associated with the service entity.

In still another aspect, the UE-ESMC 800 can contain a security component 806 that can comprise a desired security code, which can be received from the ESMC of the service entity, for example, when the subscriber is being registered with the service entity or at another desired time (e.g., when a new security code is requested, when the subscriber inputs the security code). In an embodiment, the security component 806 can receive a security code from the subscriber in relation to an unlock request (e.g., pressing the designated unlock key on the UE), and the security component 806 can receive the security code from the subscriber. In another embodiment, the security code can be stored in the data store 820, and retrieved from the data store in response to an unlock request or other request (e.g., request for communication services, request for a promotional item or service from the service entity, etc.). The security code and UE identifier can be communicated by the UE, employing the UE-ESMC 800, to the ESMC of the service entity to facilitate authenticating the UE and subscriber and processing the desired request. In still another embodiment, the UE-ESMC 800 can operate without a security component 806, wherein an RFID tag associated with the UE can provide the security code to the ESMC at desired times to facilitate processing a subscriber's request.

In yet another aspect, the UE-ESMC 800 can include an authenticator component 808 that can operate in conjunction with the security component 806 to facilitate authenticating the subscriber and/or request made by the subscriber. In an embodiment, the authenticator component 808 can prompt the subscriber to input the security code in response to input relating to an unlock request (e.g., pressing the designated unlock key on the UE), and the authenticator component 808 can receive the security code from the subscriber. The authenticator component 808 can validate the request and send the request to the ESMC when the received security code matches a stored security code, or can deny (and not send) the request when the received security code does not match the stored security code.

In an aspect, the UE-ESMC 800 can comprise a communication management component 810 that can facilitate controlling communication of information between the UE and the entity management component, including the ESMC, the door lock for the subscriber's room with the service entity, service requests, etc. The communication management component 810 also can facilitate controlling the provision of integrated services to the communication devices in the subscriber's room.

The UE-ESMC 800 can contain an interface component 812 that can comprise one or more interfaces (e.g., display screens, touch screens, buttons, controls, switches, adapters, connectors, speakers, etc.) that can be utilized to facilitate presentation of information to a UE user or receiving data input from a UE user. In an aspect, the interface component 812 can present messages or information related to phone calls, messages, alerts, or other communications. The interface component 812 can facilitate presentation of buttons, controls, or menus to facilitate making or answering phone calls, generating and sending messages, viewing messages or alerts, integrating the UE with the entity management system of a service entity, controlling the locking state of the lock on the subscriber's room with the service entity, generating and sending requests, receiving input information, etc.

In an aspect, the interface component 812 can include a dedicated key component 814 (e.g., room key, hot/soft key) that can comprise one or more buttons that can facilitate performing one or more desired functions. For example, the dedicated key component 814 can configure a particular button or set of buttons on the interface component 812 that, when manipulated (e.g., pressed), can generate and send an unlock request to the entity management system to facilitate unlocking the subscriber's door lock for the subscriber's room with the service entity. As another example, the dedicated key component 814 can configure a particular button or set of buttons on the interface component 812 that can act as a portal key (e.g., hot/soft key) that, when manipulated, can enable the UE to access the service entity's portal and associated portal services in a same or similar manner as if the subscriber was in the subscriber's room using the room's TV and remote control unit to access the service entity's portal and associated portal services. When accessed by the UE, via the UE-ESMC 800, the portal services can be displayed or otherwise presented by the interface component 812 to the subscriber.

In yet another aspect, the interface component 812 also can comprise an alert component 816 that can generate and present a desired alert signal or message on the UE (e.g., UE display screen, UE speaker, etc.). The alert signal can be, for example, an alert message, which can include desired information indicating to what the alert message relates (e.g., incoming phone call, security code or new security code, room number, voice mail received, message received, etc.), or can be a visual, audio, or other sensory (e.g., vibration) signal or indicator.

In yet another aspect, the UE-ESMC 800 can comprise a processor component 818 that can work in conjunction with the other components (e.g., application component 802, identification component 804, security component 806, authenticator component 808, communications management component 810, interface component 812, dedicated key component 814, alert component 816, etc.) to facilitate performing the various functions of the UE-ESMC 800. The processor component 818 can employ one or more processors, microprocessors, or controllers that can process data, such as information relating to integrating the UE with an entity management system of a service entity, information relating to integrating the subscriber's own communication services with the service entity's communication services, information relating to operations of the UE-ESMC 800, and/or other information, etc., to facilitate operation of the UE-ESMC 800, as more fully disclosed herein, and control data flow between the UE-ESMC 800 and other components (e.g., entity management system, ESMC, APs, other components in a communication network, etc.) associated with the UE-ESMC 800.

The UE-ESMC 800 also can include a data store 820 that can store data structures (e.g., user data, metadata), code structure(s) (e.g., modules, objects, hashes, classes, procedures) or instructions, information relating to integrating the UE with an entity management system of a service entity, information relating to integrating the subscriber's own communication services with the service entity's communication services, information relating to operations of the UE-ESMC 800, etc., to facilitate controlling operations associated with the UE-ESMC 800. In an aspect, the processor component 818 can be functionally coupled (e.g., through a memory bus) to the data store 820 in order to store and retrieve information desired to operate and/or confer functionality, at least in part, to the application component 802, identification component 804, security component 806, authenticator component 808, communications management component 810, interface component 812, dedicated key component 814, alert component 816, and/or substantially any other operational aspects of the UE-ESMC 800.

Figure 9:
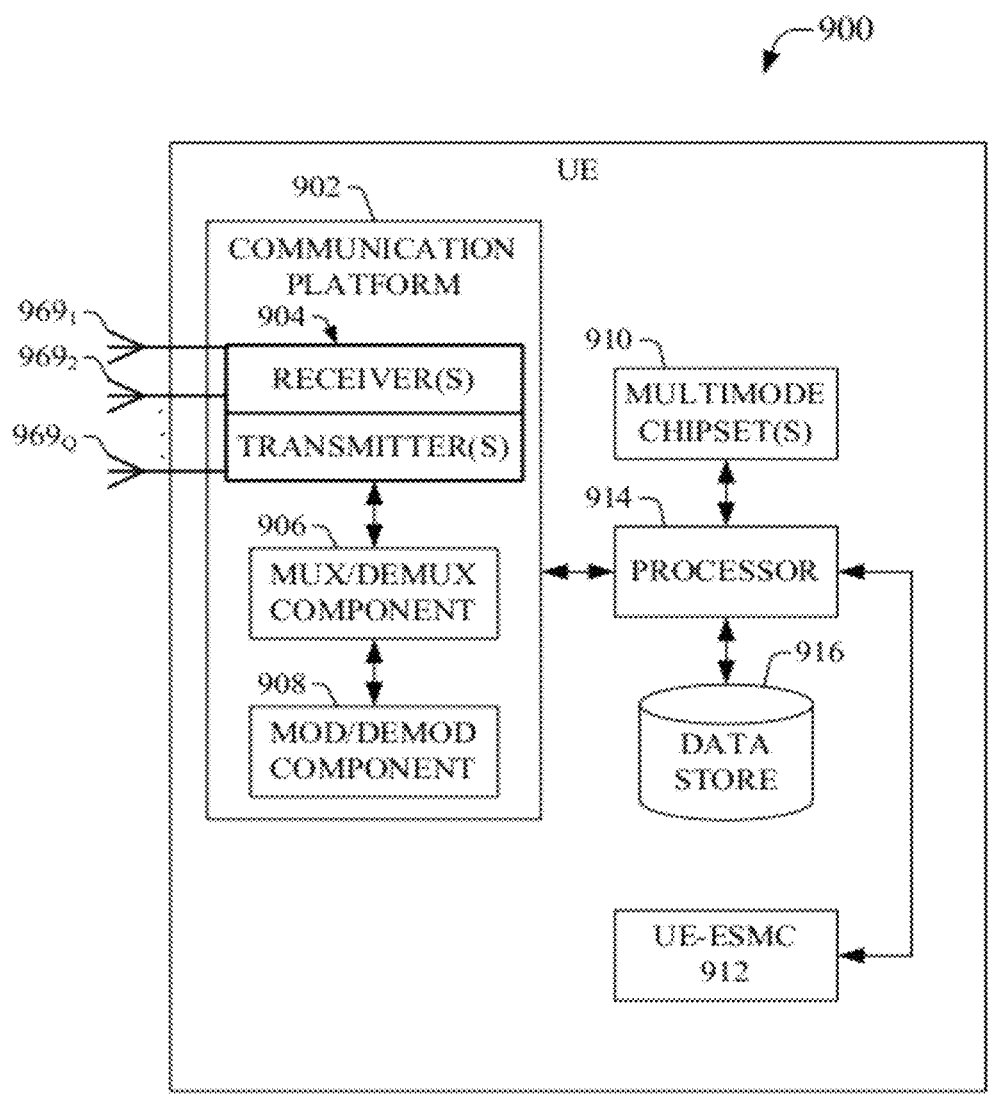
FIG. 9 illustrates a block diagram of an example UE in accordance with an aspect of the disclosed subject matter.

FIG. 9 depicts a block diagram of an example UE 900 in accordance with an aspect of the disclosed subject matter. In an aspect, the UE 900 can be a multimode access terminal, wherein a set of antennas $969_1$-$969_Q$ (Q is a positive integer) can receive and transmit signal(s) from and to wireless devices like access points, access terminals, wireless ports and routers, and so forth, that operate in a radio access network. It should be appreciated that antennas $969_1$-$969_Q$ are a part of communication platform 902, which comprises electronic components and associated circuitry that provide for processing and manipulation of received signal(s) and signal(s) to be transmitted; e.g., receivers and transmitters 904, multiplexer/demultiplexer (mux/demux) component 906, and modulation/demodulation (mod/demod) component 908.

In another aspect, the UE 900 can include a multimode operation chipset(s) 910 that can allow the UE 900 to operate in multiple communication modes in accordance with disparate technical specification for wireless technologies. In an aspect, multimode operation chipset(s) 910 can utilize communication platform 902 in accordance with a specific mode of operation (e.g., voice, GPS, etc.). In another aspect, multimode operation chipset(s) 910 can be scheduled to operate concurrently (e.g., when Q>1) in various modes or within a multitask paradigm.

In still another aspect, the UE 900 can comprise a UE-ESMC 912 that can facilitate integrating the UE with the entity management system of a service entity, integrating the subscriber's communication services with the service entity's communication services, using the UE to access the service entity's communication services, as more fully described herein. The UE-ESMC 912 can facilitate using the UE 900 as a room key to control the locking state of the subscriber's room with the service entity, as more fully described herein.

In still another aspect, the UE 900 also can include a processor(s) 914 that can be configured to confer functionality, at least in part, to substantially any electronic component within the UE 800, in accordance with aspects of the disclosed subject matter. For example, the processor(s) 914 can facilitate enabling the UE 900 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 914 can facilitate enabling the UE 900 to process data relating to messaging, voice calls, or other services (e.g., Internet services or access, services related to applications, etc.). In accordance with other examples, the processor(s) 914 can facilitate using the UE 900 as a room key, integrating the UE 900 with the entity management system, integrating the subscriber's own communication services with the service entity's communication services, accessing the service entity's communication services, etc.

The UE 900 also can contain a data store 916 that can store data structures (e.g., user data, metadata); code structure(s) (e.g., modules, objects, classes, procedures) or instructions; message hashes; neighbor cell list; one or more lists (e.g., whitelist, etc.); information relating to integrating the UE 900 with the entity management system; information relating to integrating the subscriber's own communication services with the service entity's communication services; security code; information relating to using the UE to access the service entity's communication services; UE identifier; voice calls, messaging, or other services associated with the UE 900; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 914 can be functionally coupled (e.g., through a memory bus) to the data store 916 in order to store and retrieve information (e.g., neighbor cell list; information relating to mobile messaging, voice calls, or other services; frequency offsets; desired algorithms; security code; UE identifier; etc.) desired to operate and/or confer functionality, at least in part, to communication platform 902, multimode operation chipset(s) 910, UE-ESMC 912, and/or substantially any other operational aspects of the UE 900.

Figure 10:
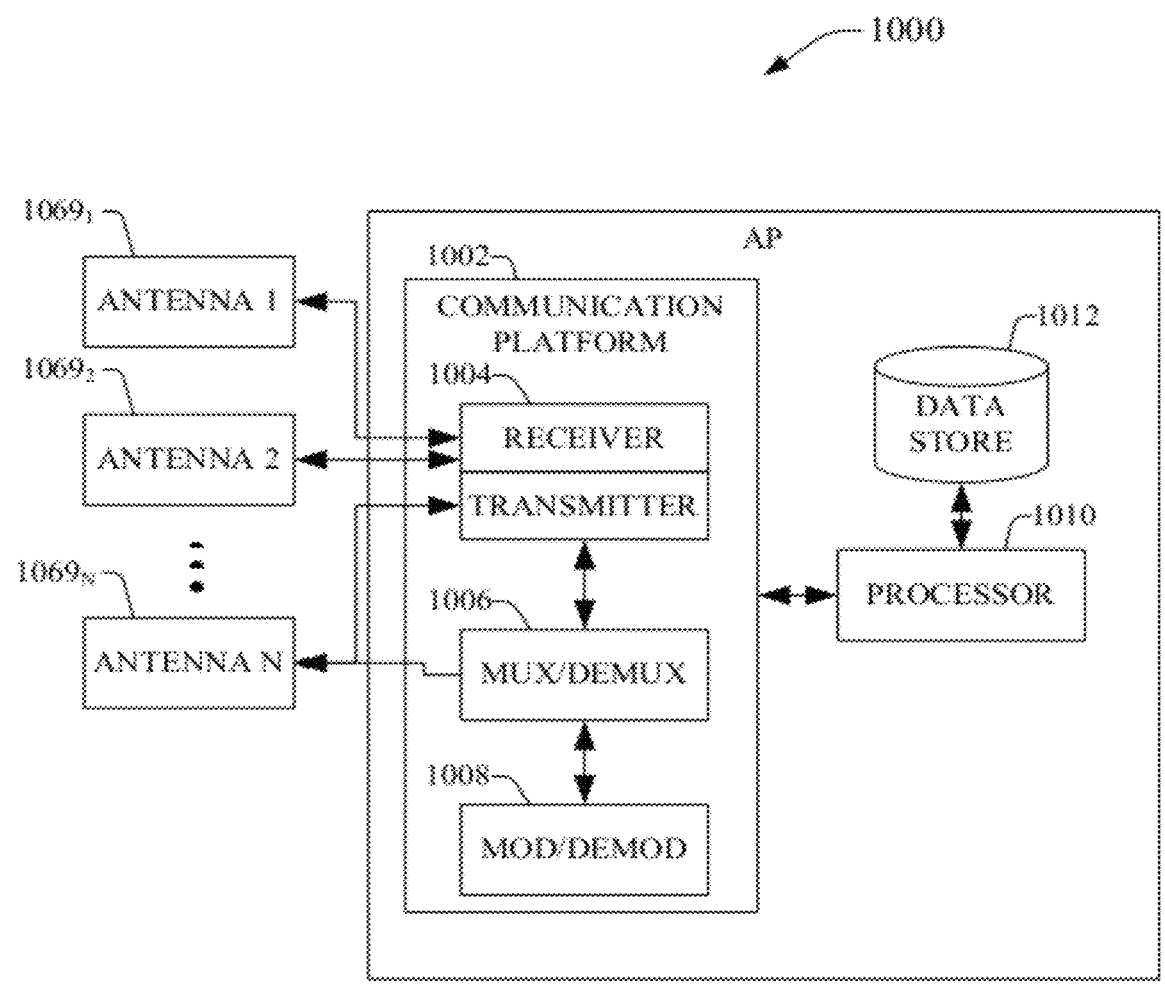
FIG. 10 illustrates a block diagram of an example access point (AP) in accordance with an aspect of the disclosed subject matter.

FIG. 10 illustrates a block diagram of an example AP 1000 (e.g., femto AP, pico AP, WI-FI AP, WI-FI-direct AP, macro base station, etc.) in accordance with an aspect of the disclosed subject matter. The AP 1000 can receive and transmit signal(s) from and to wireless devices like access points (e.g., femtocells, picocells, base stations, etc.), access terminals (e.g., UEs), wireless ports and routers, and the like, through a set of antennas $1069_1$-$1069_N$. In an aspect, the antennas $1069_1$-$1069_N$ are a part of a communication platform 1002, which comprises electronic components and associated circuitry that can provide for processing and manipulation of received signal(s) and signal(s) to be transmitted. In an aspect, the communication platform 1002 can include a receiver/transmitter 1004 that can convert signal from analog to digital upon reception, and from digital to analog upon transmission. In addition, receiver/transmitter 1004 can divide a single data stream into multiple, parallel data streams, or perform the reciprocal operation.

In an aspect, coupled to receiver/transmitter 1004 can be a multiplexer/demultiplexer (mux/demux) 1006 that can facilitate manipulation of signal in time and frequency space. The mux/demux 1006 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1006 can scramble and spread information (e.g., codes) according to substantially any code known in the art, e.g., Hadamard-Walsh codes, Baker codes, Kasami codes, polyphase codes, and so on. A modulator/demodulator (mod/demod) 1008 also can be part of the communication platform 1002, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1000 also can comprise a processor(s) 1010 that can be configured to confer and/or facilitate providing functionality, at least partially, to substantially any electronic component in or associated with the AP 1000. For instance, the processor(s) 1010 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 1010 also can facilitate other operations on data, for example, to facilitate managing or maintaining a white list that includes information, such as communication device identifiers associated with communication devices that can connect to the AP 1000 to communicate voice or data, etc.

In another aspect, the AP 1000 can include a data store 1012 that can store data structures; code instructions; rate coding information; information relating to measurement of radio link quality or reception of information related thereto; information relating to establishing a communications connection between a communication device (e.g., UE) and other communication devices, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1010 can be coupled to the data store 1012 in order to store and retrieve information (e.g., information, such as algorithms, relating to multiplexing/demultiplexing or modulation/demodulation, information relating to radio link levels, information relating to establishing communication connections associated with a UE(s) served by the AP 1000, information relating to the white list, etc.) desired to operate and/or confer functionality to the communication platform 1002, and/or other operational components of AP 1000.

In view of the example systems and/or devices described herein, example methodologies that can be implemented in accordance with the disclosed subject matter can be better appreciated with reference to flowcharts in FIGS. 11-17. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a method in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 11:
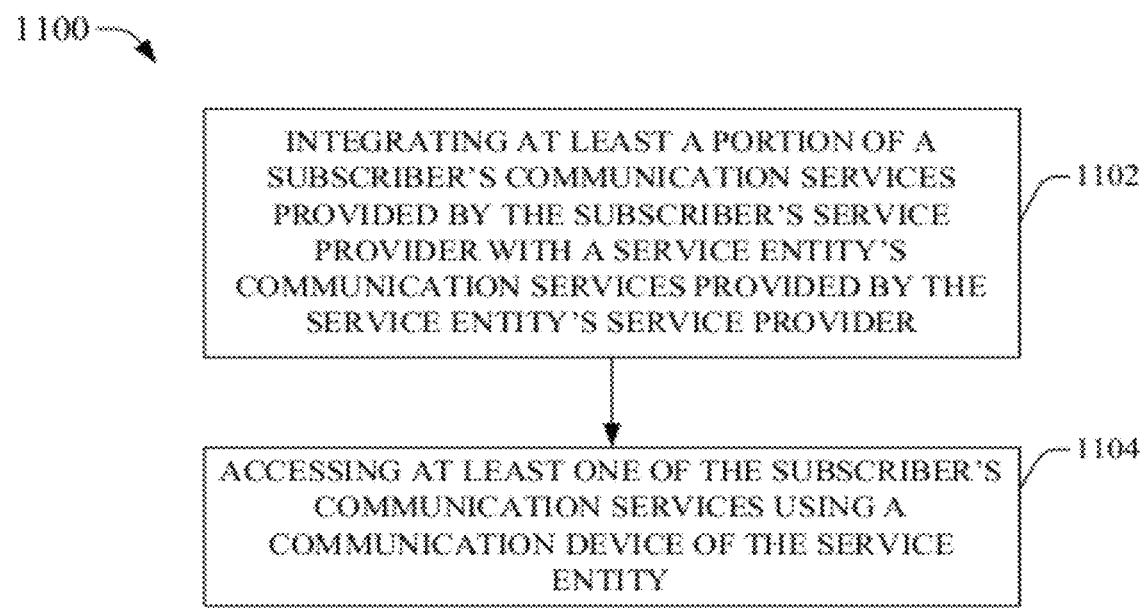
FIG. 11 illustrates a flowchart of an example method for integrating a subscriber's communication services with a service entity's communication services in accordance with various aspects and embodiments of the disclosed subject matter.

FIG. 11 presents a flowchart of an example method 1100 for integrating a subscriber's communication services with a service entity's communication services in accordance with various aspects and embodiments of the disclosed subject matter. At 1102, at least a portion of a subscriber's communication services provided by the subscriber's service provider can be integrated with a service entity's communication services provided by the service entity's service provider. In an aspect, the a desired portion of the subscriber's own communication services can be integrated with the service entity's communication service, for example, when the subscriber registers or checks in with the service entity, wherein the service entity can provide the user with a communication device, such as a TV, that can be used to access and use the integrated communication services of the subscriber and service entity.

The subscriber's service provider can be the same or different than the service entity's service provider. However, when the subscriber's service provider is different than the service entity's service provider, a broker service can be employed to facilitate integration of the subscriber's and service entity's respective communication services with each other.

At 1104, at least one of the subscriber's communication services can be accessed using a communication device of the service entity. In an aspect, one or more of the subscriber's communication services can be accessed and presented on a communication device, such as a TV, of the service entity.

Figure 12:
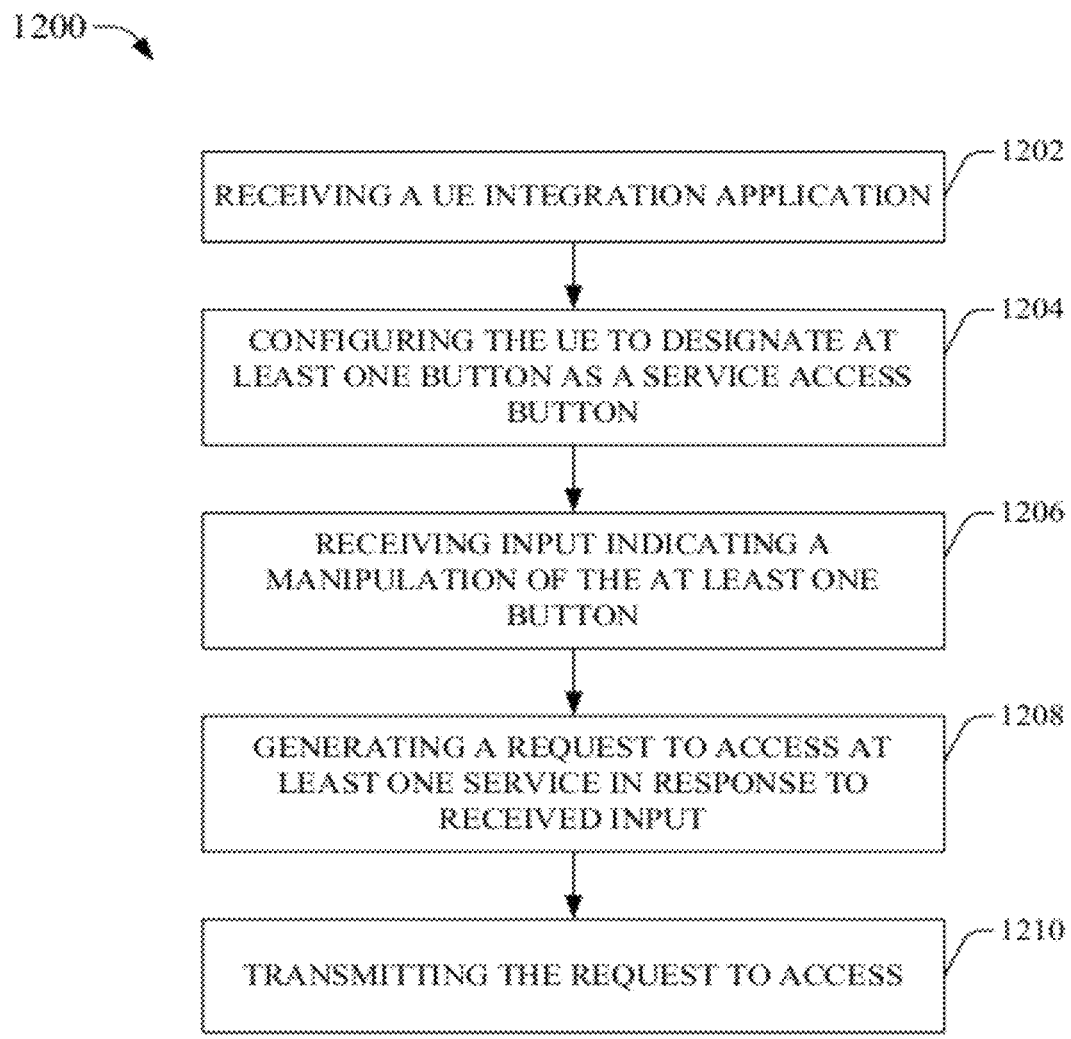
FIG. 12 depicts a flowchart of an example method for integrating a subscriber's communication services with a service entity's communication services in accordance with various aspects and embodiments of the disclosed subject matter.

FIG. 12 illustrates a flowchart of another example method 1200 for integrating a subscriber's communication services with a service entity's communication services in accordance with various aspects and embodiments of the disclosed subject matter. At 1202, a UE integration application can be received. The UE integration application can be received by the UE from the ESMC. At 1204, the UE can be configured to designate at least one button as a service access button. The UE integration application can be executed by the UE to facilitate configuring the UE so that at least one button can be designated as a service button to facilitate using the UE to facilitate accessing services (e.g., integrated services), such as at least a portion of the subscriber's own communication services or the service provider's communication services, on the UE or other communication devices (e.g., TV in the subscriber's room provided by the service entity).

At 1206, input indicating a manipulation of the at least one button can be received. For instance, the UE can receive input indicating selection of or pressing of the at least one button from, for example, the subscriber. At 1208, a request to access at least one service can be generated in response to received input. The UE, employing the UE-ESMC, can generate a request to access the at least one service. In an aspect, the request can comprise information, such as the type of request, the service being requested, the UE identifier, and/or the security code, for example. At 1210, the request can be transmitted, for example, to the entity management system for processing.

Figure 13:
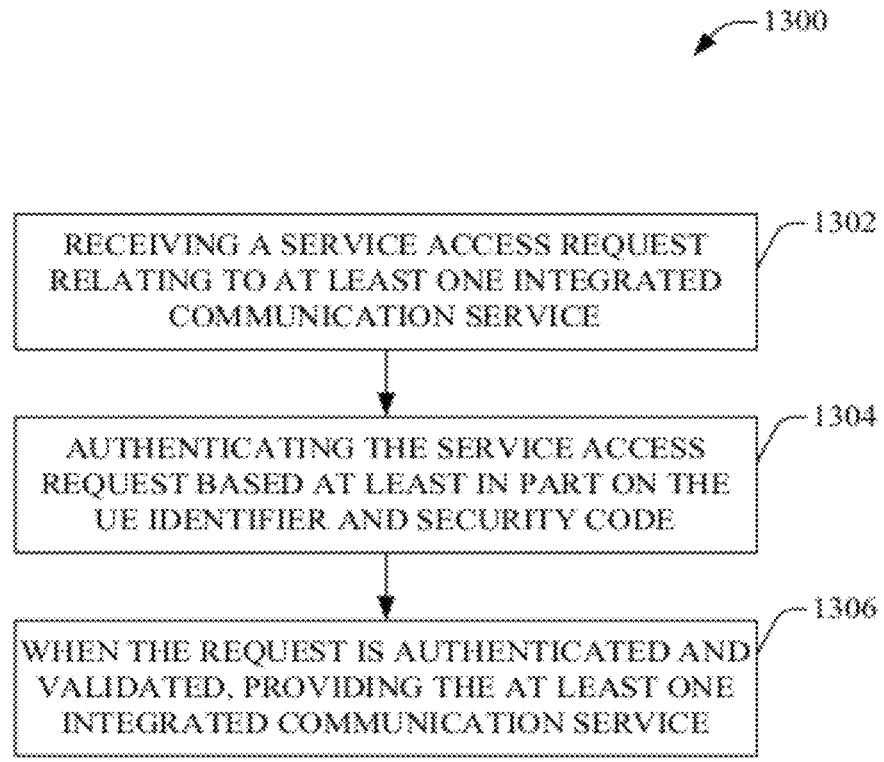
FIG. 13 illustrates a flowchart of an example method for integrating a subscriber's communication services with a service entity's communication services in accordance with various aspects and embodiments of the disclosed subject matter.

FIG. 13 illustrates a flowchart of another example method 1300 for integrating a subscriber's communication services with a service entity's communication services in accordance with various aspects and embodiments of the disclosed subject matter. Method 1300 can be employed, for example, at least in part by an entity management system, wherein a subscriber's UE has been integrated with the entity management system. At 1302, a service access request relating to at least one integrated communication service can be received, for example, from the subscriber's UE. The UE can be integrated with the entity management system, wherein a designated button(s) (e.g., hot/soft key(s)) on the UE can be employed to access the integrated communication services available to the subscriber on the UE and/or other desired communication device (e.g., TV in the subscriber's room provided by the service entity). The service access request can be a request to access at least one of the integrated communication services available to the subscriber via the entity management system, wherein the integrated communication services can comprise at least a portion of the subscriber's own communication services (e.g., subscriber's home wireless and wireline communication service) and the service entity's communication services. The service access request can comprise information relating to the type of communication service requested, UE identifier, security code, and/or other information.

At 1304, the service access request can be authenticated based at least in part on the UE identifier and security code. In an aspect, the ESMC can compare the stored UE identifier and security code with the received UE identifier and security code, and if there is a match of the stored UE identifier and security code with the received UE identifier and security code, the ESMC can verify or validate the request, and if there is not a match of the UE identifiers and security codes, the ESMC can determine that the request is invalid. At 1306, when the request is authenticated and validated, the at least one integrated communication service can be accessed and provided to, for example, the UE or other desired communication device (e.g., TV in subscriber's room at the service entity's premises).

Figure 14:
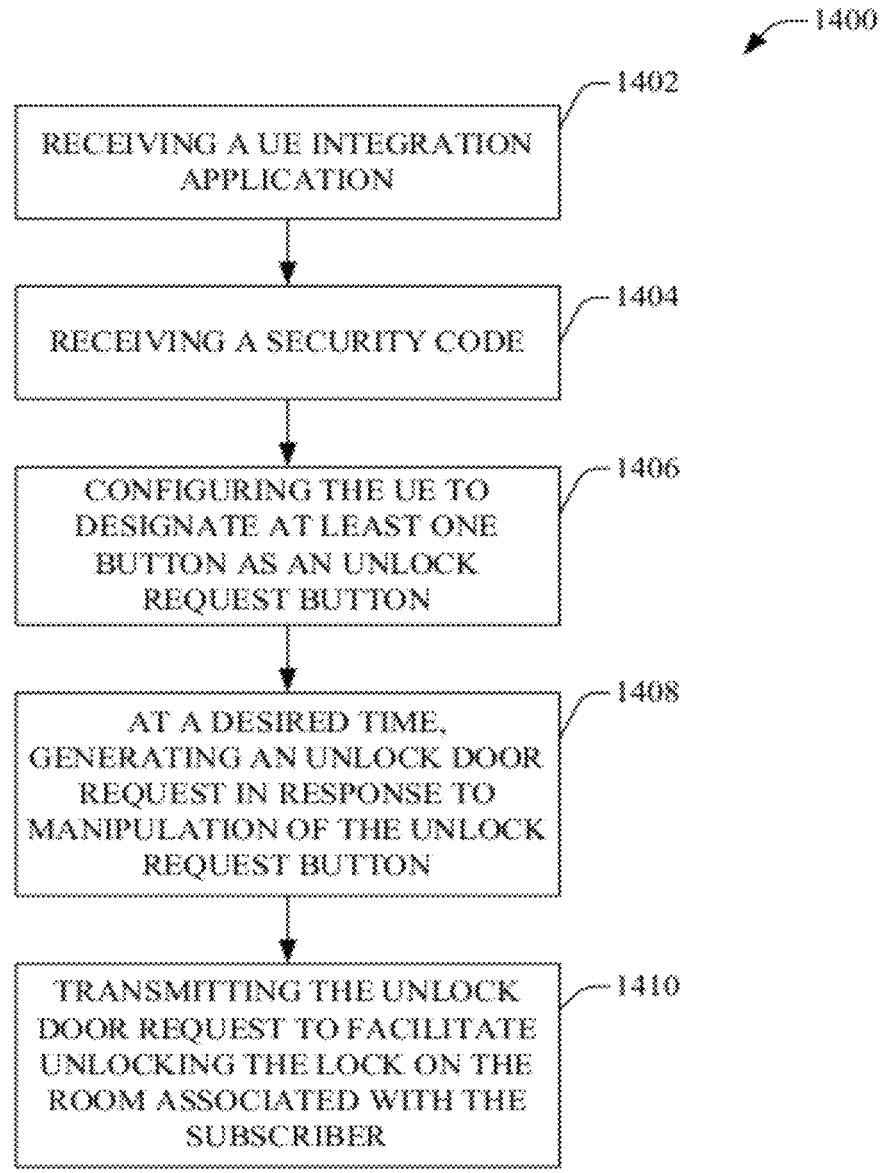
FIG. 14 depicts a flowchart of an example method that can integrate a subscriber's UE with an entity management system of a service entity to facilitate controlling a door lock in accordance with aspects of the disclosed subject matter.

FIG. 14 depicts a flowchart of an example method 1400 that can integrate a subscriber's UE with an entity management system of a service entity to facilitate controlling a door lock in accordance with aspects of the disclosed subject matter. Method 1400 can be employed all or at least in part by a UE to facilitate configuring the UE to be usable to control the locking state of a door lock for a room on the service entity's premises and provided to the subscriber by a service entity, for example, when the subscriber checks in or registers with the service entity.

At 1402, a UE integration application can be received. The UE integration application can be received by the UE from the ESMC. At 1404, a security code can be received, for example, by the UE from the ESMC. At 1406, the UE can be configured to designate at least one button as an unlock request button. The UE integration application can be executed by the UE to facilitate configuring the UE so that at least one button can be designated as an unlock request button to facilitate using the UE as a door key to control the locking state of the door lock on the subscriber's room with the service entity. At 1408, at a desired time, an unlock door request can be generated in response to manipulation of the unlock request button, for example, by the subscriber. The unlock door request can comprise the UE identifier and/or security code. In various embodiments, the unlock door request can include the UE identifier and security code. In accordance with one embodiment, when an RFID tag is employed for use with the UE, the unlock door request can comprise the UE identifier and the RFID tag can provide the security code.

At 1410, the unlock door request can be transmitted to facilitate unlocking the lock on the room associated with the subscriber. In accordance with various embodiments, the unlock door request can be transmitted to the ESMC, to a WI-FI-direct AP or router, or directly to the door lock on the subscriber's room. In accordance with various aspects, the unlock door request can be communicated via a macro AP, femto AP (or pico AP), and/or WI-FI AP from the UE to the desired destination (e.g., ESMC, WI-FI-direct AP or router, door lock).

Figure 15:
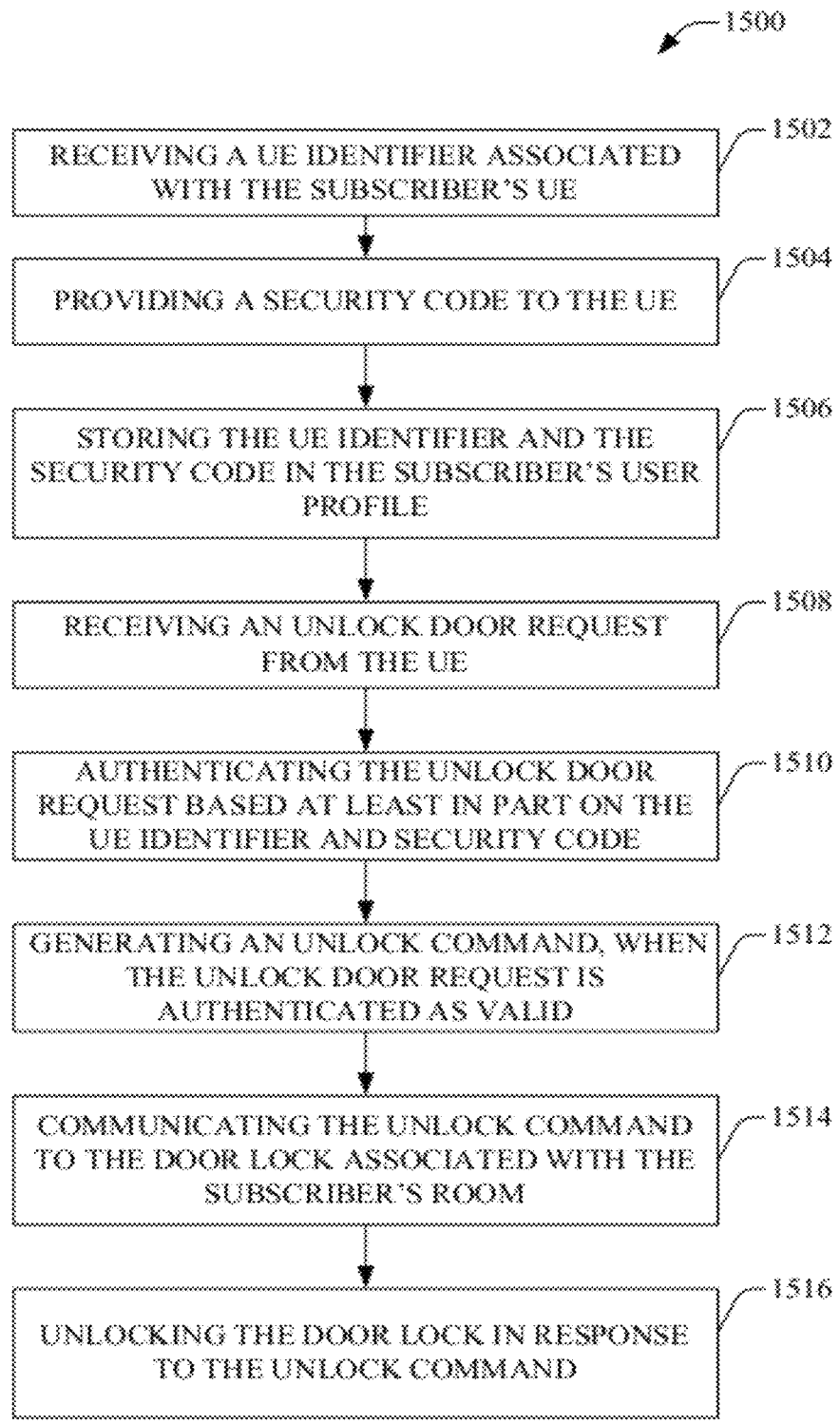
FIG. 15 illustrates a flowchart of an example method that can integrate a subscriber's UE with an entity management system of a service entity to facilitate controlling a door lock in accordance with aspects of the disclosed subject matter.

FIG. 15 depicts a flowchart of another example method 1500 that can integrate a subscriber's UE with an entity management system of a service entity to facilitate controlling a door lock in accordance with aspects of the disclosed subject matter. Method 1500 can be employed all or at least in part by the entity management system. At 1502, a UE identifier associated with the subscriber's UE can be received. At 1504, a security code can be provided (e.g., transmitted) to the UE.

At 1506, the UE identifier and the security code can be stored in the subscriber's user profile. In an aspect, the ESMC can store the UE identifier and security of the subscriber in the subscriber's user profile. The subscriber's user profile can be associated with and include information regarding a room on the service entity's premises to which the subscriber can be checked in or registered.

At 1508, an unlock door request can be received from the UE. The door unlock request can comprise information, including, for example, the UE identifier and security code, assigned to the UE. At 1510, the unlock door request can be authenticated based at least in part on the UE identifier and security code. In an aspect, the ESMC can compare the stored UE identifier and security code with the received UE identifier and security code, and if there is a match of the stored UE identifier and security code with the received UE identifier and security code, the ESMC can verify or validate the unlock door request, and if there is not a match of the UE identifiers and security codes, the ESMC can determine that the unlock door request is invalid.

At 1512, when the unlock door request is authenticated as valid, an unlock command can be generated. At 1514, the unlock command can be communicated (e.g., transmitted) to the door lock associated with the subscriber's room. At 1516, the door lock can be unlocked in response to the unlock command.

Figure 16:
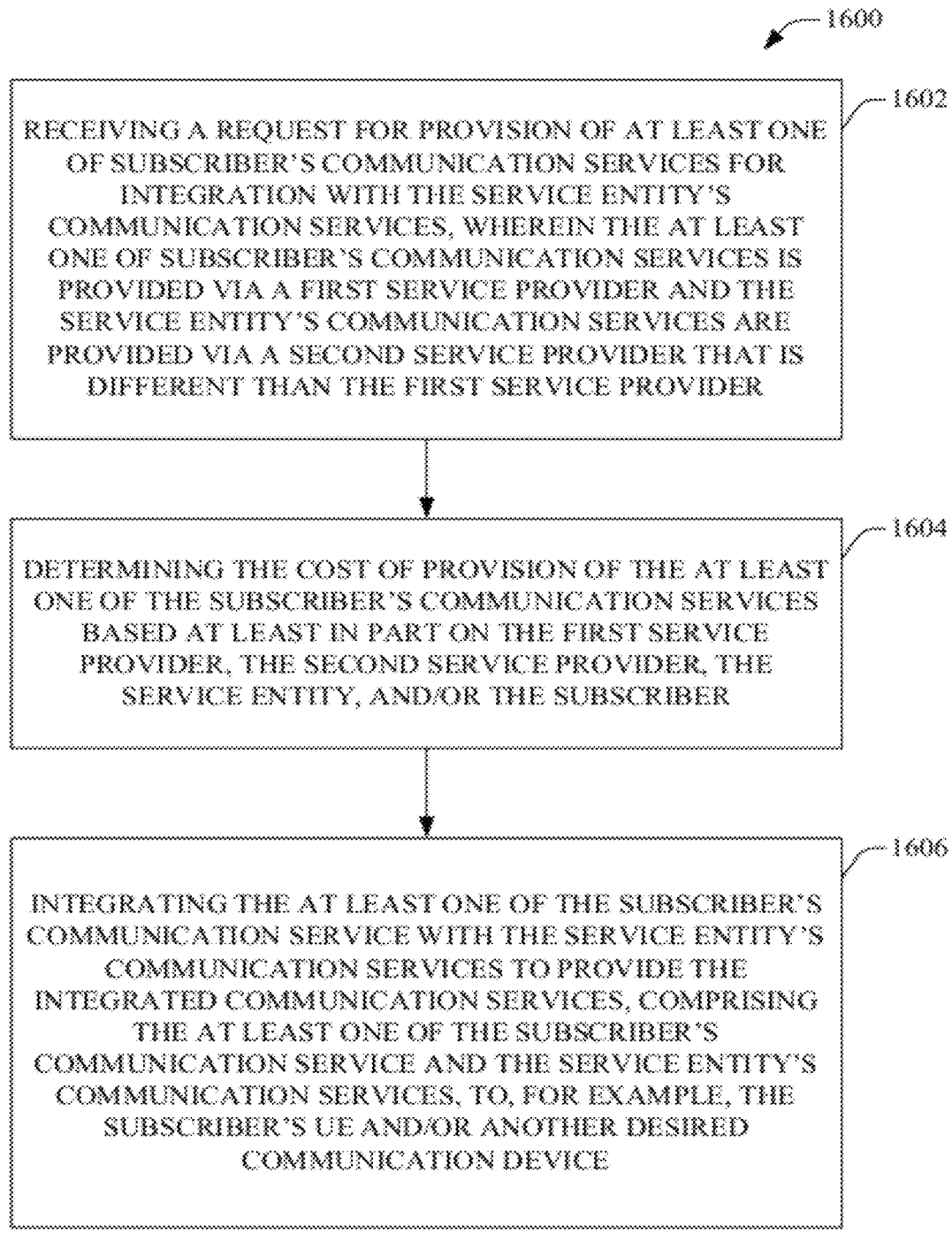
FIG. 16 depicts a flowchart of an example method that can facilitate integration and provision of a subscriber's communication services with a service entity's communication services (e.g., via a broker service) in accordance with aspects of the disclosed subject matter.

FIG. 16 illustrates a flowchart of an example method 1600 that can facilitate integration and provision of a subscriber's communication services with a service entity's communication services (e.g., via a broker service) in accordance with aspects of the disclosed subject matter. At 1602, a request for provision of at least one of subscriber's communication services for integration with the service entity's communication services can be received, wherein the at least one of subscriber's communication services is provided via a first service provider and the service entity's communication services are provided via a second service provider that is different than the first service provider.

At 1604, the cost of provision of the at least one of the subscriber's communication services can be determined or identified based at least in part on the first service provider, the second service provider, the service entity, and/or the subscriber (e.g., VIP status of the subscriber in relation to the service entity or first service provider). At 1606, the at least one of the subscriber's communication service can be integrated with the service entity's communication services to provide the integrated communication services, comprising the at least one of the subscriber's communication service and the service entity's communication services, to, for example, the subscriber's UE and/or another desired communication device (e.g., TV in the subscriber's room provided by the service entity).

Figure 17:
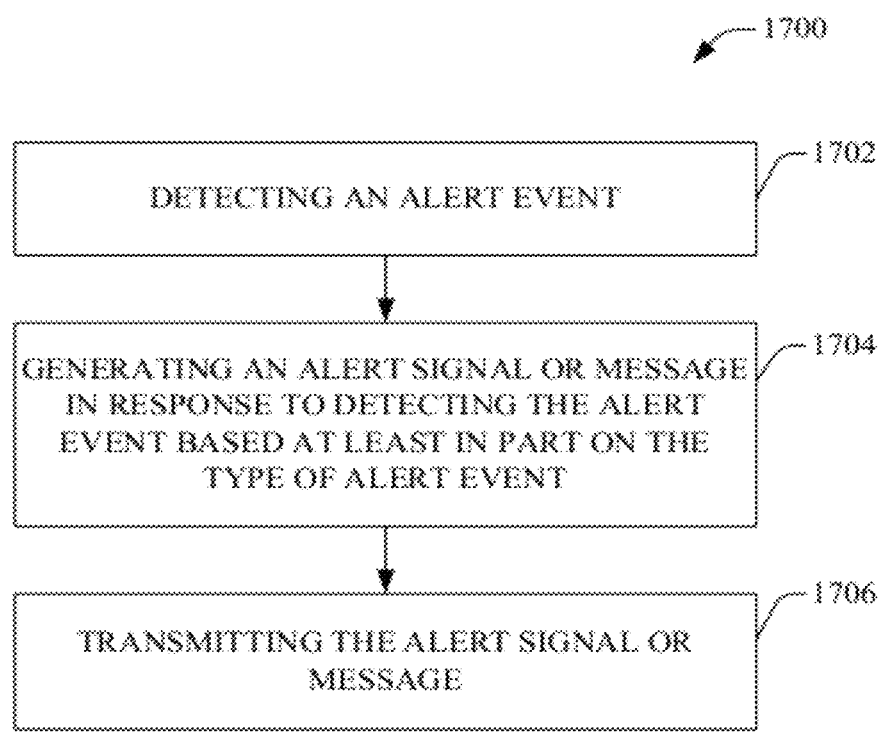
FIG. 17 illustrates a flowchart of an example method that can facilitate alerting a subscriber in accordance with aspects of the disclosed subject matter.

FIG. 17 illustrates a flowchart of an example method 1700 that can facilitate alerting a subscriber in accordance with aspects of the disclosed subject matter. Method 1700 can be performed at least in part by the entity management system to facilitate generating and transmitting a desired alert signal or message to a subscriber's UE or another communication device, for example, when the subscriber is checked in or registered with a service entity. At 1702, an alert event can be detected. In accordance with various aspects, the alert event can relate to an incoming phone call, message, security code, check out notification and/or prompting to have subscriber indicate that an extension of the registration is requested, promotion offered by the service entity or other entity associated therewith, notification of a TV program, etc.

At 1704, an alert signal or message can be generated in response to detecting the alert event based at least in part on the type of alert event. The alert signal or message, if any, also can be based at least in part on a priority level of the event. For example, based at least in part on the type of event and priority level of the event, one type of event having a high priority level can result in a first type of alert signal or message indicative of a higher priority or urgency; a second type of event can have a medium priority level that can result in a second type of alert signal or message indicative of a lower priority or urgency; and a third type of event can have a low priority level that can result in no alert signal or message being generated.

At 1706, the alert signal or message can be transmitted. In an aspect, the alert signal or message can be transmitted to and presented by the UE or other desired communication device (e.g., room's phone, room's TV, etc.). With the integration of the UE with the entity management system of the service entity, as desired, the alert signal or message can be transmitted to the UE for presentation by the UE. For example, an incoming phone call, voice mail, or text message to the subscriber's room's phone can result in an alert signal or message being generated and transmitted to the subscriber's UE, and/or the incoming phone call, voice mail, or text message can be forwarded to the UE. As another example, information relating to a promotional item or service of the service entity or another entity associated therewith that would typically be provided to the subscriber via the TV in the subscriber's room can be included in an alert message that can be sent to the UE.

In some aspects the teachings herein can or may be employed in a network that includes macro scale coverage (e.g., a large area cellular network such as a 3G network, typically referred to as a macrocell network) and smaller scale coverage (e.g., a residence-based or building-based network environment). As an access terminal ("AT") moves through such a network, the AT may be served in certain locations by access nodes ("ANs") that provide macro coverage while the AT may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macrocell, a femtocell, or a picocell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femtocell, and so on.

Figure 18:
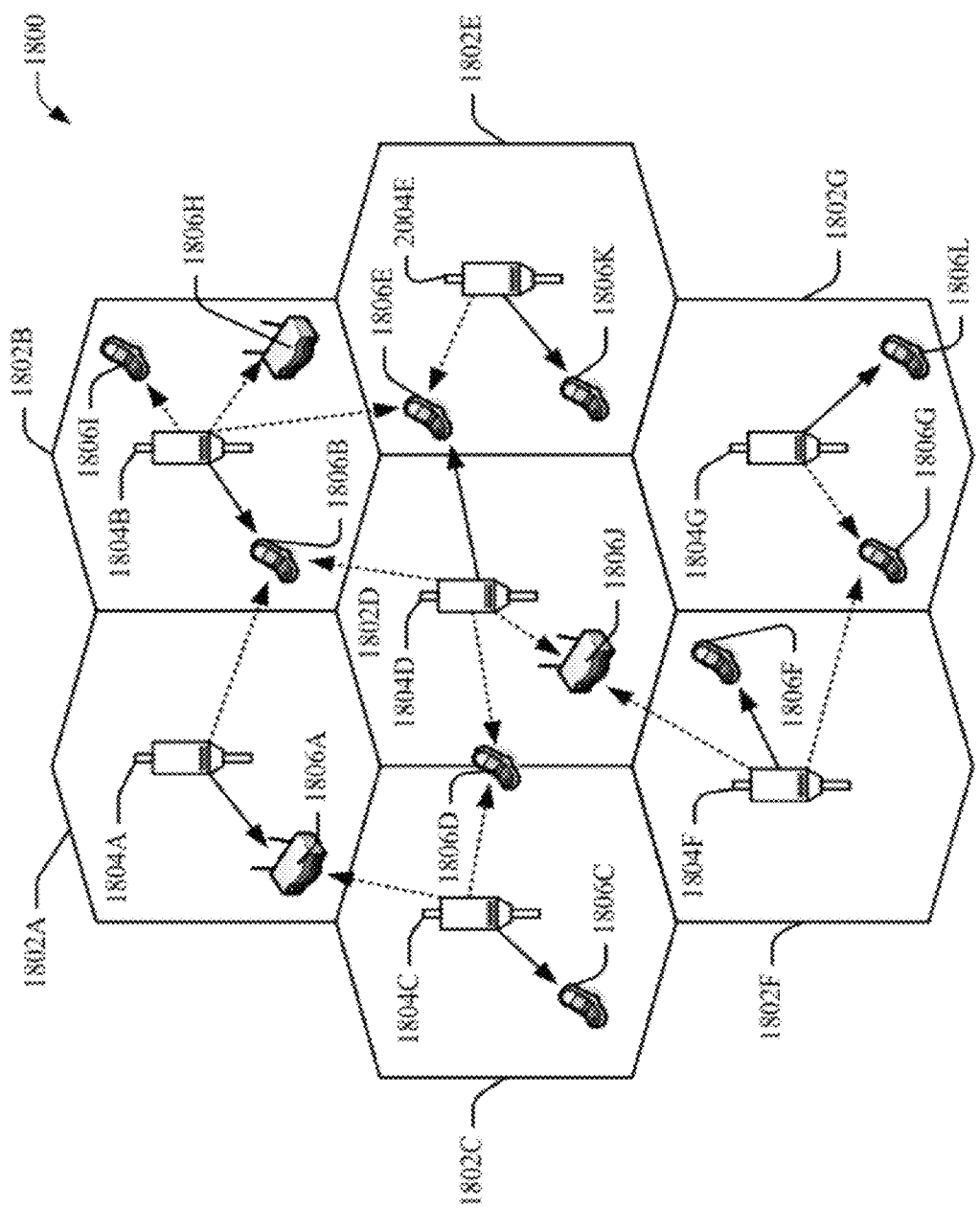
FIG. 18 illustrates an example wireless communication system in accordance with an embodiment of the disclosed subject matter.

FIG. 18 illustrates a wireless communication system 1800, configured to support a number of users, in which the teachings herein may be implemented. The system 1800 provides communication for multiple cells 1802, such as, for example, macro cells 1802A-1802G, with each cell being serviced by a corresponding access node 1804 (e.g., access nodes 1804A-1804G). As shown in FIG. 18, access terminals 1806 (e.g., access terminals 1806A-1806L) may be dispersed at various locations throughout the system over time. Each access terminal 1806 may communicate with one or more access nodes 1804 on a forward link ("FL") and/or a reverse link ("RL") at a given moment, depending upon whether the access terminal 1806 is active and whether it is in soft handoff, for example. The wireless communication system 1800 may provide service over a large geographic region. For example, macro cells 1802A-1802G may cover a few blocks in a neighborhood.

Figure 19:
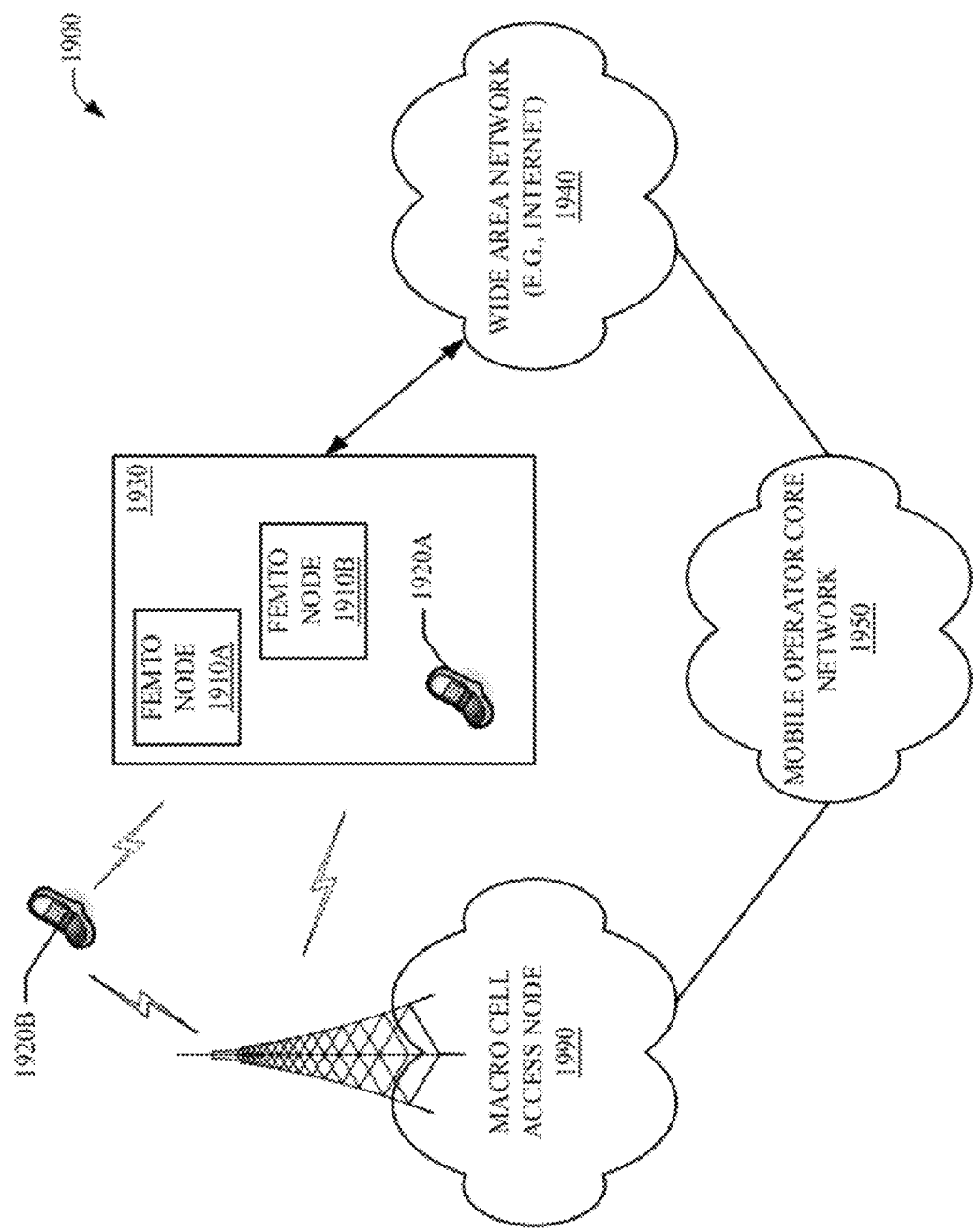
FIG. 19 illustrates an example communication system where one or more femto nodes are deployed within a network environment.

FIG. 19 illustrates an exemplary communication system 1900 where one or more femto nodes are deployed within a network environment. Specifically, the system 1900 includes multiple femto nodes 1910 (e.g., femto nodes 1910A and 1910B) installed in a relatively small scale network environment (e.g., in one or more user residences 1930). Each femto node 1910 may be coupled to a wide area network 1940 (e.g., the Internet) and a mobile operator core network 1950 via a DSL router, a cable modem, a wireless link, or other connectivity means (not shown). As will be discussed below, each femto node 1910 may be configured to serve associated access terminals 1920 (e.g., access terminal 1920A) and, optionally, alien access terminals 1920 (e.g., access terminal 1920B). In other words, access to femto nodes 1910 may be restricted whereby a given access terminal 1920 may be served by a set of designated (e.g., home) femto node(s) 1910 but may not be served by any non-designated femto nodes 1910 (e.g., a neighbor's femto node 1910).

Figure 20:
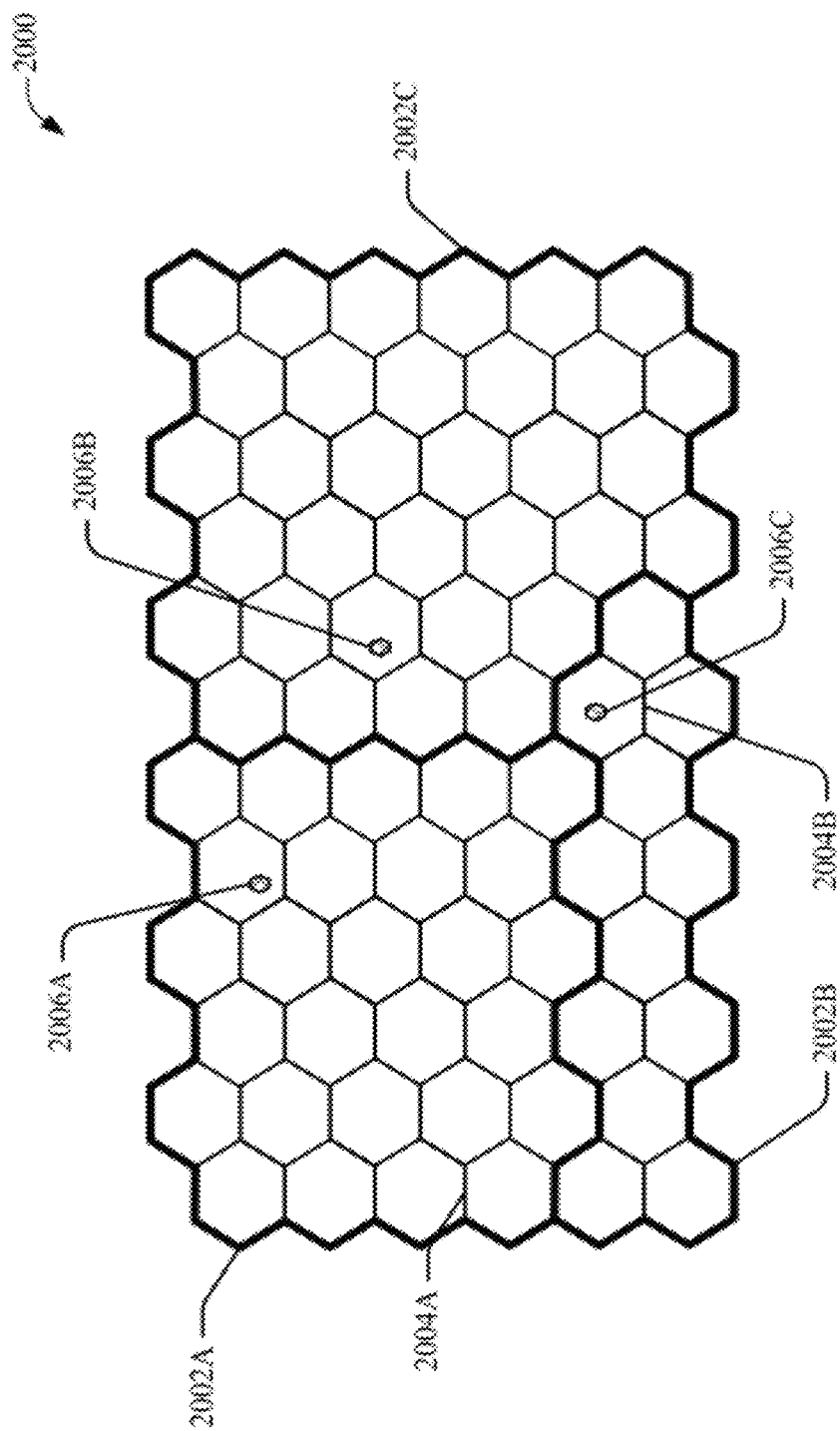
FIG. 20 illustrates an example of a coverage map in accordance with an embodiment of the disclosed subject matter.

FIG. 20 illustrates an example of a coverage map 2000 where several tracking areas 2002 (or routing areas or location areas) are defined, each of which includes several macro coverage areas 2004. Here, areas of coverage associated with tracking areas 2002A, 2002B, and 2002C are delineated by the wide lines and the macro coverage areas 2004 are represented by the hexagons. The tracking areas 2002 also include femto coverage areas 2006. In this example, each of the femto coverage areas 2006 (e.g., femto coverage area 2006C) is depicted within a macro coverage area 2004 (e.g., macro coverage area 2004B). It should be appreciated, however, that a femto coverage area 2006 may not lie entirely within a macro coverage area 2004. In practice, a large number of femto coverage areas 2006 may be defined with a given tracking area 2002 or macro coverage area 2004. Also, one or more pico coverage areas (not shown) may be defined within a given tracking area 2002 or macro coverage area 2004.

Referring again to FIG. 21, the owner of a femto node 2110 may subscribe to mobile service, such as, for example, 3G mobile service, offered through the mobile operator core network 2150. In addition, an access terminal 2120 may be capable of operating both in macro environments and in smaller scale (e.g., residential) network environments. In other words, depending on the current location of the access terminal 2120, the access terminal 2120 may be served by an access node 2160 of the macro cell mobile network 2150 or by any one of a set of femto nodes 2110 (e.g., the femto nodes 2110A and 2110B that reside within a corresponding user residence 2130). For example, when a subscriber is outside his home, he is served by a standard macro access node (e.g., node 2160) and when the subscriber is at home, he is served by a femto node (e.g., node 2110A). Here, it should be appreciated that a femto node 2120 may be backward compatible with existing access terminals 2120.

A femto node 2110 may be deployed on a single frequency or, in the alternative, on multiple frequencies. Depending on the particular configuration, the single frequency or one or more of the multiple frequencies may overlap with one or more frequencies used by a macro node (e.g., node 2160).

In some aspects, an access terminal 2120 may be configured to connect to a preferred femto node (e.g., the home femto node of the access terminal 2120) whenever such connectivity is possible. For example, whenever the access terminal 2120 is within the user's residence 2130, it may be desired that the access terminal 2120 communicate only with the home femto node 2110.

In some aspects, if the access terminal 2120 operates within the macro cellular network 2150 but is not residing on its most preferred network (e.g., as defined in a preferred roaming list), the access terminal 2120 may continue to search for the most preferred network (e.g., the preferred femto node 2110) using a Better System Reselection ("BSR"), which may involve a periodic scanning of available systems to determine whether better systems are currently available, and subsequent efforts to associate with such preferred systems. With the acquisition entry, the access terminal 2120 may limit the search for specific band and channel. For example, the search for the most preferred system may be repeated periodically. Upon discovery of a preferred femto node 2110, the access terminal 2120 selects the femto node 2110 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 2110 that reside within the corresponding user residence 2130). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 21:
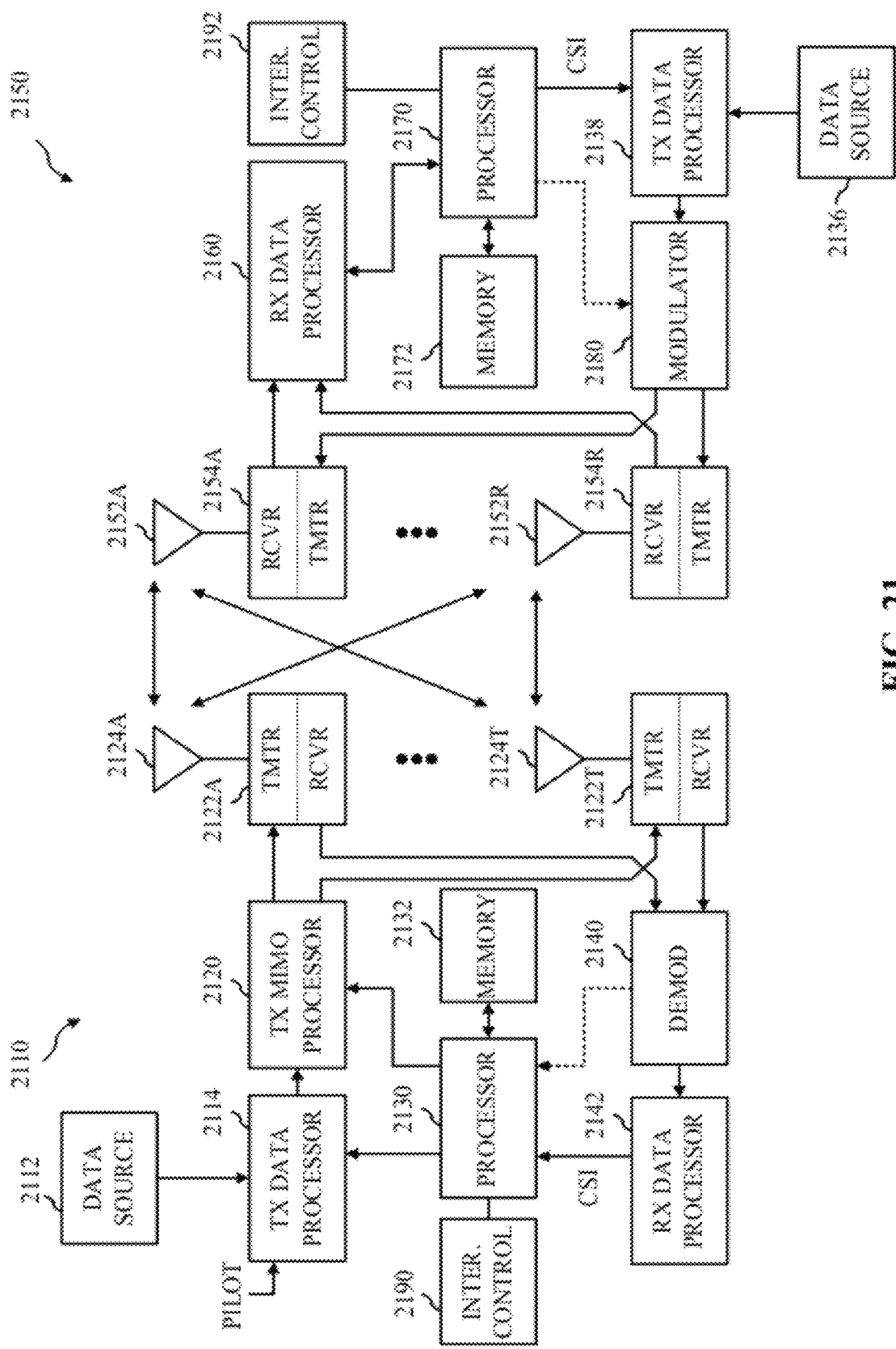
FIG. 21 depicts several sample components that can or may be employed to facilitate communication between nodes in accordance with an embodiment of the disclosed subject matter.

The teachings herein may be incorporated into a node (e.g., a device) employing various components for communicating with at least one other node. FIG. 21 depicts several sample components that may be employed to facilitate communication between nodes. Specifically, FIG. 21 illustrates a wireless device 2110 (e.g., an access point) and a wireless device 2150 (e.g., an access terminal) of a MIMO system 2100. At the device 2110, traffic data for a number of data streams is provided from a data source 2112 to a transmit ("TX") data processor 2114.

In some aspects, each data stream is transmitted over a respective transmit antenna. The TX data processor 2114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2130. A data memory 2132 may store program code, data, and other information used by the processor 2130 or other components of the device 2110.

The modulation symbols for all data streams are then provided to a TX MIMO processor 2120, which may further process the modulation symbols (e.g., for OFDM). The TX MIMO processor 2120 then provides $N_T$ modulation symbol streams to $N_T$ transceivers ("XCVR") 2122A through 2122T. In some aspects, the TX MIMO processor 2120 applies beam-forming weights to the symbols of the data streams and to the antenna from which the symbol is being transmitted.

Each transceiver 2122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2122A through 2122T are then transmitted from $N_T$ antennas 2124A through 2124T, respectively.

At the device 2150, the transmitted modulated signals are received by $N_R$ antennas 2152A through 2152R and the received signal from each antenna 2152 is provided to a respective transceiver ("XCVR") 2154A through 2154R. Each transceiver 2154 conditions (e.g., filters, amplifies, and downconverts) a respective received signal, digitizes the conditioned signal to provide samples, and further processes the samples to provide a corresponding "received" symbol stream.

A receive ("RX") data processor 2160 then receives and processes the $N_R$ received symbol streams from $N_R$ transceivers 2154 based on a particular receiver processing technique to provide $N_T$ "detected" symbol streams. The RX data processor 2160 then demodulates, deinterleaves, and decodes each detected symbol stream to recover the traffic data for the data stream. The processing by the RX data processor 2160 is complementary to that performed by the TX MIMO processor 2120 and the TX data processor 2114 at the device 2110.

A processor 2170 periodically determines which pre-coding matrix to use (discussed below). The processor 2170 formulates a reverse link message comprising a matrix index portion and a rank value portion. A data memory 2172 may store program code, data, and other information used by the processor 2170 or other components of the device 2150.

The reverse link message may comprise various types of information regarding the communication link and/or the received data stream. The reverse link message is then processed by a TX data processor 2138, which also receives traffic data for a number of data streams from a data source 2136, modulated by a modulator 2180, conditioned by the transceivers 2154A through 2154R, and transmitted back to the device 2110.

At the device 2110, the modulated signals from the device 2150 are received by the antennas 2124, conditioned by the transceivers 2122, demodulated by a demodulator ("DE-MOD") 2140, and processed by a RX data processor 2142 to extract the reverse link message transmitted by the device 2150. The processor 2130 then determines which pre-coding matrix to use for determining the beam-forming weights then processes the extracted message.

FIG. 21 also illustrates that the communication components can or may include one or more components that perform interference control operations as taught herein. For example, an interference ("INTER.") control component 2190 may cooperate with the processor 2130 and/or other components of the device 2110 to send/receive signals to/from another device (e.g., device 2150) as taught herein. Similarly, an interference control component 2192 may cooperate with the processor 2170 and/or other components of the device 2150 to send/receive signals to/from another device (e.g., device 2110). It should be appreciated that for each device 2110 and 2150 the functionality of two or more of the described components may be provided by a single component. For example, a single processing component may provide the functionality of the interference control component 2190 and the processor 2130 and a single processing component may provide the functionality of the interference control component 2192 and the processor 2170.

It is to be appreciated and understood that components (e.g., UE, AP, communication network, core network, IP-based network, ESMC, UE-ESMC, etc.), as described with regard to a particular system or method, can include the same or similar functionality as respective components (e.g., respectively named components or similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store instructions; and
a processor, coupled to the memory, that facilitates execution of the instructions to perform operations, comprising:
facilitating control of a local communication network device to facilitate communication between a mobile communication device associated with a subscriber identity and a communication device associated with a service entity identity of an entity management system, wherein the mobile communication device is associated with a subscription for a set of communication services associated with the subscriber identity;
facilitating integration of the mobile communication device with the entity management system; and
in response to the facilitating the integration of the mobile communication device with the entity management system, facilitating integration of the set of communication services associated with the subscriber identity with a set of communication services associated with the service entity identity, based on a first portability key associated with the subscriber identity and a second portability key associated with the service entity identity that are transmitted to an application programming interface of a service provider device associated with a service provider identity, to facilitate access of the set of communication services associated with the subscriber identity using the communication device.

2. The system of claim 1, wherein the set of communication services associated with the subscriber identity comprises a set of wireline communication services.

3. The system of claim 2, wherein the set of wireline communication services comprises a defined number of television channels.

4. The system of claim 1, wherein the operations further comprise sending an application to the mobile communication device to facilitate configuration of the mobile communication device to enable use of the mobile communication device to facilitate accessing the set of communication services associated with the subscriber identity and the set of communication services associated with the service entity identity using the communication device associated with the service entity identity.

5. The system of claim 4, wherein the application facilitates the configuration of the mobile communication device to use the mobile communication device to facilitate control of a locking state of a door lock on a room associated with the subscriber identity, wherein the room is located on a premises associated with the service entity identity.

6. The system of claim 5, wherein the application facilitates the configuration of the mobile communication device to employ a first button usable to facilitate the access of the set of communication services associated with the subscriber identity and the set of communication services associated with the service entity identity, and a second button usable to facilitate the control of the locking state on the door lock.

7. The system of claim 5, wherein the operations further comprise:
   receiving an unlock door request that comprises a device identifier associated with the mobile communication device from the mobile communication device;
   authenticating the unlock door request based on the device identifier; and
   transmitting an unlock command to the door lock to facilitate transition of the door lock to an unlock state in response to determining the unlock door request to be valid based on the authenticating of the unlock door request.

8. The system of claim 7, wherein the operations further comprise receiving a security code from a radio-frequency identification tag associated with the mobile communication device to facilitate the authenticating of the unlock door request.

9. The system of claim 1, wherein the operations further comprise:
   invoking the application programming interface of the service provider device of a set of service provider devices, wherein the set of service provider devices facilitate providing the set of communication services associated with the subscription associated with the subscriber identity and the set of communication services associated with the service entity identity via the communication device.

10. The system of claim 1, wherein the operations further comprise receiving, by the communication device from the service provider device, the set of communication services associated with the subscriber identity, in accordance with the subscription associated with the subscriber identity, and the set of communication services associated with the service entity identity, in accordance with another subscription associated with the service entity identity.

11. The system of claim 1, wherein the operations further comprise:
   receiving, by the communication device from the service provider device associated with the service provider identity, the set of communication services associated with the subscriber identity, in accordance with the subscription associated with the subscriber identity; and
   receiving, from the second service provider device associated with a second service provider identity, the set of communication services associated with the service entity identity by the communication device, in accordance with another subscription associated with the service entity identity.

12. The system of claim 1, wherein the operations further comprise:
   tracking door lock events associated with a set of rooms associated with a set of subscriber identities, wherein the set of rooms is located on a premises associated with the service entity identity; and
   in response to another subscriber identity in the set of subscriber identities unlocking a door lock of a room associated with the another subscriber identity during a period of time, transmitting an alert signal to the mobile communication device to facilitate notifying the subscriber identity that the other subscriber identity has unlocked the door lock of the room, wherein the room is part of the set of rooms.

13. A method, comprising:
   facilitating, by a system comprising a processor, integration of a user equipment associated with a subscriber identity with an entity management system associated with a service entity identity, wherein the user equipment is associated with a subscription for a set of communication services associated with the subscriber identity;
   in response to the integration of the user equipment with the entity management system, facilitating, by the system, integration of the set of communication services associated with the subscriber identity with a set of communication services associated with the service entity identity based on a first portability key associated with the subscriber identity and a second portability key associated with the service entity identity that are transmitted to an application programming interface of a service provider device associated with a service provider identity; and
   accessing, by the system, a communication service of the set of communication services associated with the subscriber identity via a communication device associated with the service entity identity.

14. The method of claim 13, further comprising:
   receiving, by the system, an integration application;
   configuring, by the system, the user equipment to designate a button of the user equipment as a service access button;
   receiving, by the system, input information indicating manipulation of the service access button;
   in response to the input information, generating, by the system, a request to access the communication service of the set of communication services associated with the subscriber identity; and
   transmitting, by the system, the request to access to facilitate the accessing of the communication service.

15. The method of claim 13, further comprising:
   receiving, by the system, a request to access the communication service of the set of communication services associated with the subscriber identity, wherein the request to access comprises a user equipment identifier and a security code associated with the user equipment;
   authenticating, by the system, the request to access based on the user equipment identifier and the security code; and
   in response to the request to access being determined to be verified based on the authenticating of the request to access, accessing, by the system, the communication service via the communication device associated with the service entity identity.

16. The method of claim 13, further comprising:
   receiving, by the system, an integration application;
   configuring, by the system, the user equipment to designate a button of the user equipment as a lock control button;
   receiving, by the system, a security code assigned to the user equipment;
   generating, by the system, an unlock door request in response to detecting a manipulation of the lock control button; and
   transmitting, by the system, the unlock door request, comprising the security code, to facilitate unlocking a door lock associated with a room that is located on a premises associated with the service entity identity.

17. The method of claim 13, further comprising:

receiving, by the system, an unlock door request, wherein the unlock door request comprises a security code associated with the user equipment;

authenticating, by the system, the unlock door request based on the security code;

in response to the unlock door request being determined to be verified based on the authenticating of the unlock door request, generating, by the system, an unlock door command; and transmitting, by the system, the unlock door request to a door lock associated with a room associated with the subscriber identity, wherein the room is located on a premises associated with the service entity identity.

18. The method of claim 13, further comprising:

receiving, by the system, a request for provisioning of the set of communication services associated with the subscriber identity for integration with the set of communication services associated with the service entity identity, wherein the set of communication services associated with the subscriber identity is provided via a first service provider device and the set of communication services associated with the service entity identity are provided via a second service provider device that is different from the first service provider device;

connecting, by the system, with a communication services broker service to facilitate the provisioning of the set of communication services associated with the subscriber identity;

determining, by the system, a cost for the provisioning of the set of communication services associated with the subscriber identity; and enabling, by the system, the set of communication services associated with the subscriber identity in response to receiving acceptance information indicating acceptance of a payment plan relating to the cost.

19. A system, comprising:

a memory to store instructions; and a processor, coupled to the memory, that facilitates execution of the instructions to perform operations, comprising:

facilitating integrating a mobile communication device associated with a subscriber identity with an entity management system associated with a service entity identity to facilitate integrating a set of communication services associated with the subscriber identity with a set of communication services associated with the service entity identity based on a first portability key associated with the subscriber identity and a second portability key associated with the service entity identity that are communicated to an application programming interface of a service provider device associated with a service provider identity, wherein the mobile communication device is associated with the subscription for the set of communication services associated with the subscriber identity; and configuring a button of the mobile communication device as a service access button to facilitate accessing the set of communication services associated with the subscriber identity via a communication device associated with the entity management system in response to selecting of the service access button, wherein the set of communication services associated with the subscriber identity comprises a wireline communication service available to the subscriber identity as part of the subscription associated with a service provider device.

20. The system of claim 19, wherein the operations further comprise:

configuring a second button of the mobile communication device as a lock control button to facilitate controlling a locking state of a door lock associated with a room that is associated with the service entity identity in response to selecting of the lock control button;

generating an unlock door request, comprising a security code, in response to the selecting of the lock control button; and transmitting the unlock door request to the entity management system to facilitate the controlling of the locking state of the door lock.

* * * * *